(12) United States Patent
Hakoi et al.

(10) Patent No.: US 11,966,125 B2
(45) Date of Patent: Apr. 23, 2024

(54) LIQUID CRYSTAL DISPLAY DEVICE

(71) Applicant: Sharp Display Technology Corporation, Kameyama (JP)

(72) Inventors: Hiroyuki Hakoi, Kameyama (JP); Takashi Satoh, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/140,542

(22) Filed: Apr. 27, 2023

(65) Prior Publication Data

US 2023/0350250 A1 Nov. 2, 2023

(30) Foreign Application Priority Data

Apr. 28, 2022 (JP) ................................. 2022-074479

(51) Int. Cl.
*G02F 1/1343* (2006.01)
*G02F 1/1335* (2006.01)

(52) U.S. Cl.
CPC .. *G02F 1/134336* (2013.01); *G02F 1/133514* (2013.01); *G02F 1/133553* (2013.01); *G02F 1/13439* (2013.01)

(58) Field of Classification Search
CPC ......... G02F 1/134336; G02F 1/133514; G02F 1/133553; G02F 1/13439; G02F 1/133555; G02F 2203/09
See application file for complete search history.

(56) References Cited

U.S. PATENT DOCUMENTS

| 8,692,758 | B2 | 4/2014 | Matsuda et al. | |
|---|---|---|---|---|
| 2003/0038909 | A1* | 2/2003 | Ikeno | G02F 1/133555 |
| | | | | 349/113 |
| 2007/0177080 | A1* | 8/2007 | Higa | G02F 1/133555 |
| | | | | 349/114 |
| 2008/0151156 | A1* | 6/2008 | Ino | G02F 1/133555 |
| | | | | 349/113 |
| 2010/0295841 | A1 | 11/2010 | Matsuda et al. | |
| 2011/0013131 | A1* | 1/2011 | Tanaka | G02F 1/13394 |
| | | | | 445/24 |
| 2013/0320334 | A1 | 12/2013 | Yamazaki et al. | |
| 2019/0302512 | A1* | 10/2019 | Saitoh | G02F 1/133504 |
| 2021/0181576 | A1 | 6/2021 | Sasaki et al. | |

FOREIGN PATENT DOCUMENTS

| JP | 3394926 B2 | 4/2003 |
|---|---|---|
| JP | 5036864 B2 | 9/2012 |
| JP | 2014-007399 A1 | 1/2014 |
| JP | 2021-096461 A1 | 6/2021 |

* cited by examiner

*Primary Examiner* — Jonathan Y Jung

(74) *Attorney, Agent, or Firm* — ScienBiziP, P.C.

(57) ABSTRACT

A liquid crystal display device includes a first substrate, a second substrate, and a liquid crystal layer. Each pixel includes a reflection region and a transmission region. The first substrate includes a reflecting layer, a first insulating layer, and a pixel electrode. The thickness of the liquid crystal layer in the transmission region is greater than the thickness of the liquid crystal layer in the reflection region, and the liquid crystal layer has a twist angle of substantially 0 degree. A surface of the first substrate that faces the liquid crystal layer includes an upper step portion, a lower step portion, and an inclined portion. The length L1 of a portion of the inclined portion included in the reflection region and the length L2 of a portion of the lower step portion included in the reflection region satisfy the relationship $L1+L2 \leq 1.81 \cdot L1$.

10 Claims, 15 Drawing Sheets

LIQUID CRYSTAL DISPLAY DEVICE

BACKGROUND

1. Field

The present disclosure relates to liquid crystal display devices and, in particular, to a semi-transmissive liquid crystal display device each pixel of which includes a reflection region and a transmission region.

2. Description of the Related Art

Liquid crystal display devices (LCDs) have recently been used as semi-transmissive (or "transflective") display devices for use in smartwatches and out-of-home advertising digital signage. A semi-transmissive LCD has, in one pixel, a reflection region in which a display in a reflection mode (reflection display) is carried out and a transmission region in which a display in a transmission mode (transmission display) is carried out. Therefore, the reflection display, which involves the use of outside light, gives high viewability in an outdoor environment under sunlight, and the transmission display, which involves the use of a backlight, enables night-time viewing of information.

The inventors propose, in Japanese Unexamined Patent Application Publication No. 2021-96461, a semi-transmissive LCD that is capable of improvement in brightness of a reflection display and a transmission display. The semi-transmissive LCD disclosed in Japanese Unexamined Patent Application Publication No. 2021-96461 brings about improvement in reflectance through a double-electrode structure in which a reflecting electrode (reflecting layer) and a transparent electrode (pixel electrode) are separated from each other by an insulating layer. Further, Japanese Unexamined Patent Application Publication No. 2021-96461 also refers to a VA-ECB mode in which liquid crystal molecules are vertically aligned when no voltage is applied and liquid crystal molecules are slanted at a twist angle of 0 degree when a voltage is applied and a multiple-gap structure in which a cell gap in a reflection region and a cell gap in a transmission region are different from each other.

However, the semi-transmissive LCD of Japanese Unexamined Patent Application Publication No. 2021-96461 thus configured has been found with a problem of yellowish white that is displayed in the reflection mode (yellow shift in reflection whiteness) and a problem of great changes in chromaticity of a reflection display (reflection chromaticity) in response to variations in cell gap.

The yellow shift in reflection whiteness, which gives a display a dark impression, tends to be considered unfavorable. Further, the changes in reflection chromaticity entailed by variations in cell gap lead to variations in finished products and therefore cause a reduction in yield.

It is desirable to reduce a yellow shift in reflection whiteness and/or changes in reflection chromaticity entailed by variations in cell gap in a semi-transmissive liquid crystal display device that has a double-electrode structure and a multiple-gap structure and whose liquid crystal layer has a twist angle of 0 degree.

SUMMARY

According to an aspect of the disclosure, there is provided a liquid crystal display device including a first substrate, a second substrate facing the first substrate, and a liquid crystal layer provided between the first substrate and the second substrate. The liquid crystal display device has a plurality of pixels arrayed in a matrix. Each of the plurality of pixels includes a reflection region in which a display is carried out in a reflection mode and a transmission region in which a display is carried out in a transmission mode. The first substrate includes a reflecting layer including a portion located in the reflection region of each pixel, a first insulating layer provided so as to cover the reflecting layer, and a pixel electrode provided on top of the first insulating layer and disposed in each pixel. A thickness of the liquid crystal layer in the transmission region is greater than a thickness of the liquid crystal layer in the reflection region. The liquid crystal layer has a twist angle of substantially 0 degree. A surface of the first substrate that faces the liquid crystal layer has a step including an upper step portion located in at least the reflection region, a lower step portion located in at least the transmission region, and an inclined portion connecting the upper step portion with the lower step portion. When seen from a direction normal to a display surface, a length L1 of a portion of the inclined portion included in the reflection region and a length L2 of a portion of the lower step portion included in the reflection region satisfy a relationship $L1+L2 \leq 1.81 \cdot L1$.

DESCRIPTION OF THE EMBODIMENTS

The following describes embodiments of the present disclosure with reference to the drawings. It should be noted that the present disclosure is not limited to the following embodiments.

Embodiment 1

Figure 1:
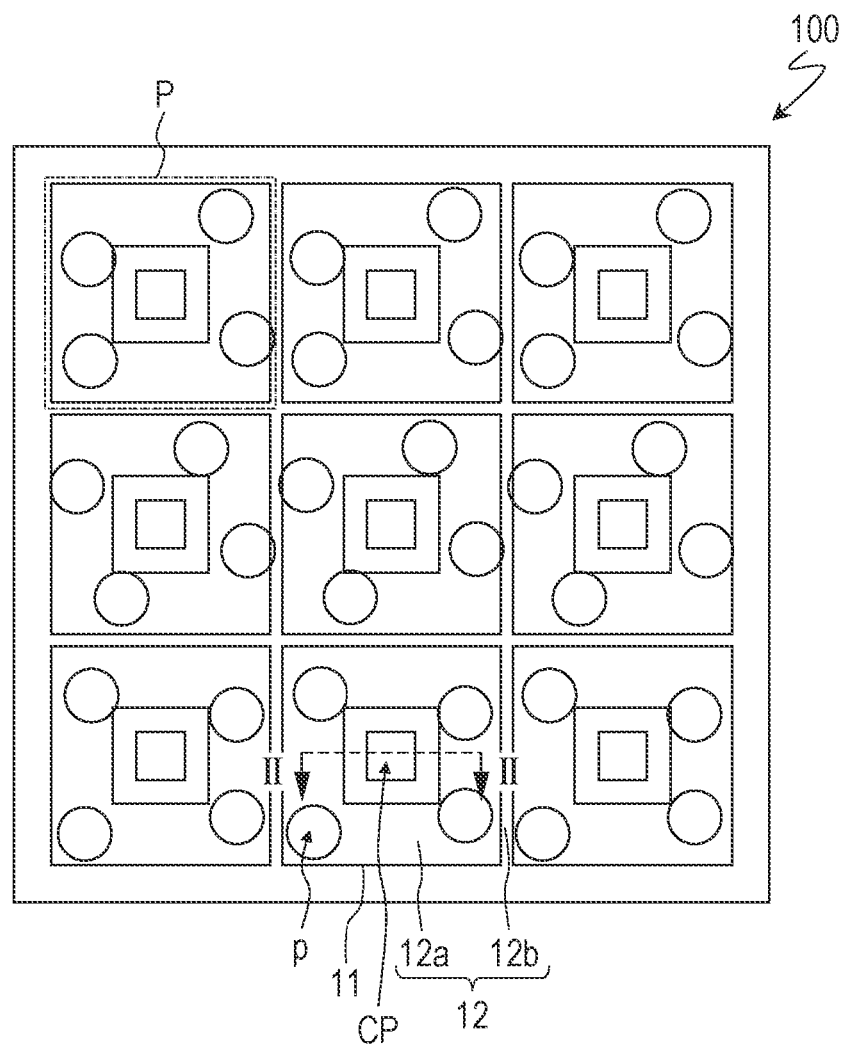
FIG. 1 is a plan view schematically showing a liquid crystal display device according to an embodiment of the present disclosure, showing a region corresponding to nine pixels of the liquid crystal display device.
Figure 2:
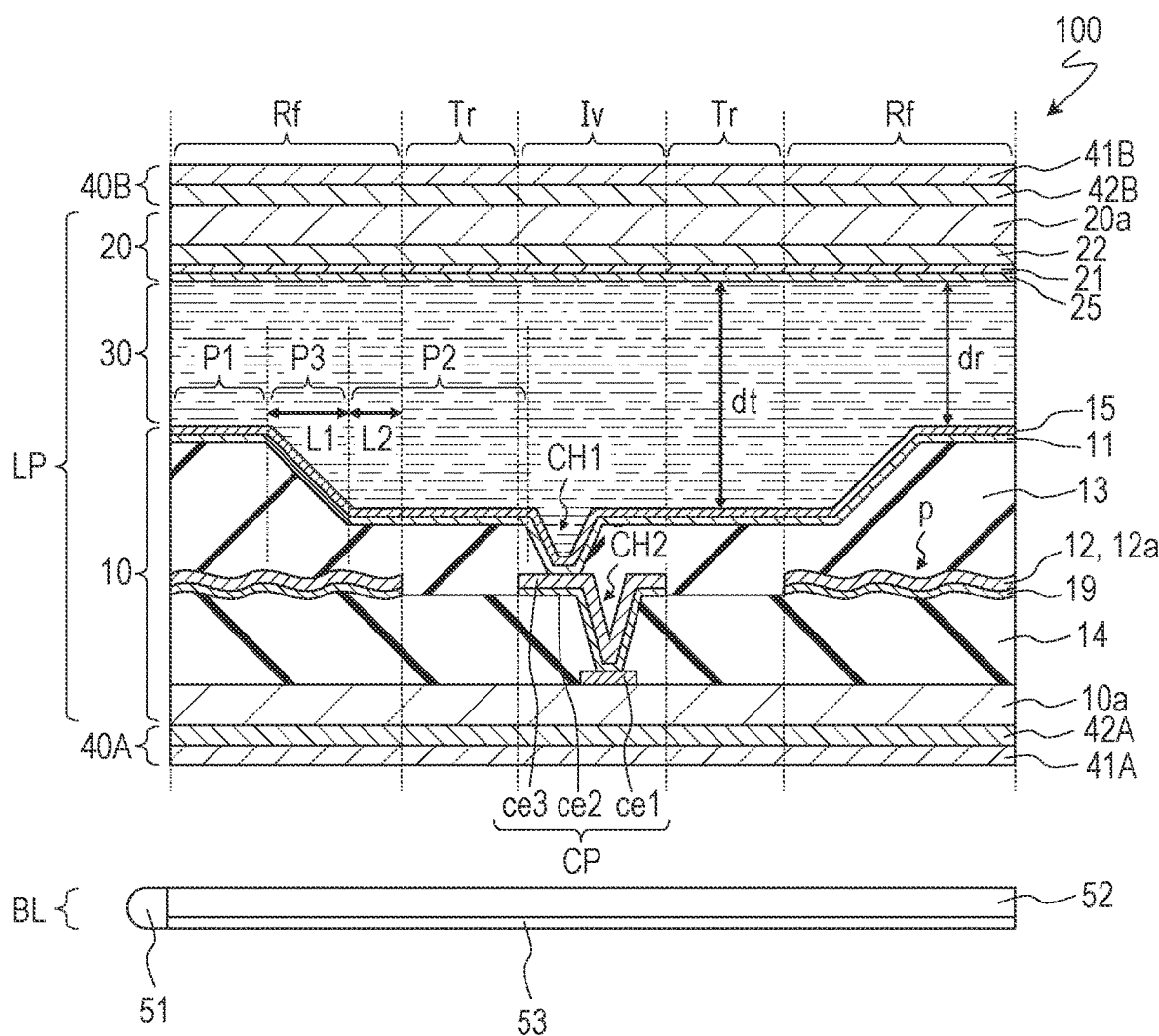
FIG. 2 is a cross-sectional view schematically showing the liquid crystal display device, showing a cross-section structure taken along line II-II in FIG. 1.

A liquid crystal display 100 device according to the present embodiment is described with reference t FIGS. 1 and 2. The liquid crystal display device 100 according to the present embodiment is a semi-transmissive (transflective) liquid crystal display device. FIG. 1 is a plan view schematically showing the liquid crystal display device 100, showing a region corresponding to nine pixels P of the liquid crystal display device 100. FIG. 2 is a cross-sectional view schematically showing the liquid crystal display device 100, showing a cross-section structure taken along line II-II in FIG. 1.

As shown in FIG. 1, the liquid crystal display device 100 has a plurality of pixels P. The plurality of pixels P are arrayed in a matrix including a plurality of rows and a plurality of columns. The plurality of pixels P typically include a red pixel that displays red, a green pixel that displays green, and a blue pixel that displays blue.

Further, as shown in FIG. 2, the liquid crystal display device 100 includes a liquid crystal display panel LP and a backlight (lighting device) BL disposed at the back of the liquid crystal display panel LP (that faces away from the viewer). The liquid crystal display panel LP includes a TFT substrate (first substrate) 10, a counter substrate (second substrate) 20 facing the TFT substrate 10, and a vertical-alignment liquid crystal layer 30 provided between the TFT substrate 10 and the counter substrate 20. Each pixel P includes a reflection region Rf in which a display is carried out in a reflection mode and a transmission region Tr in which a display is carried out in a transmission mode.

The thickness (transmission cell gap) dt of the liquid crystal layer 30 in the transmission region Tr and the thickness (reflection cell gap) dr of the liquid crystal layer 30 in the reflection region Rf are different from each other. Specifically, the transmission cell gap dt is greater than the reflection cell gap dr (i.e. dt>dr). Thus, the liquid crystal display device 100 has a multiple-gap structure.

The proportion of the area of the transmission region Tr in the pixel P is for example higher than or equal to 10% and lower than or equal to 90%, although it may be set as appropriate according to purposes. Further, the position and shape of the transmission region Tr in the pixel P may also be set as appropriate according to purposes. It should be noted that the term "invalid region" herein refers to a region Iv in the pixel P that does not contribute to a reflection display or a transmission display.

The TFT substrate 10 includes a pixel electrode 11 disposed in each pixel P and a reflecting layer 12 located further away from the liquid crystal layer 30 than the pixel electrode 11 (i.e. closer to the back than the pixel electrode 11). The TFT substrate 10 further includes a first insulating layer 13, a second insulating layer 14, a contact portion CP, and a first alignment film 15.

The constituent elements (such as the aforementioned pixel electrode 11) of the TFT substrate 10 are supported by a transparent substrate 10a. The transparent substrate 10a may be made of a material such as alkali-free glass or plastic.

On top of the transparent substrate 10a, a circuit (backplane circuit) for driving the pixels P is formed (not illustrated). The backplane circuit is not limited to particular backplane circuits. For example, the backplane circuit may include memory circuits (e.g. SRAMs) connected separately to each of the plurality of pixels P. A liquid crystal display device having memory circuits provided separately for each of the pixels P is sometimes called "memory liquid crystal display". A specific configuration of a memory liquid crystal display is disclosed, for example, in Japanese Patent No. 5036864 (which corresponds to U.S. Pat. No. 8,692,758). The entire contents of Japanese Patent No. 5036864 and U.S. Pat. No. 8,692,758 are hereby incorporated by reference. Alternatively, as is the case with a common active matrix substrate, the backplane circuit may include a thin-film transistor (TFT) connected to the pixel electrode 11. The TFT is for example a TFT (see Japanese Unexamined Patent Application Publication No. 2014-007399) including, as an active layer, an amorphous silicon layer, a polysilicon layer, or an oxide semiconductor layer containing an In—Ga—Zn—O semiconductor. The entire contents of Japanese Unexamined Patent Application Publication No. 2014-007399 are hereby incorporated by reference. The backplane circuit may include various types of wire such as a gate wire and a source wire in addition to the memory circuits and the TFT.

The second insulating layer 14 is provided so as to cover the backplane circuit. The second insulating layer 14 is a transparent insulating layer formed, for example, from a transparent organic insulating material. The second insulating layer 14 has asperities on a surface thereof. That is, the second insulating layer 14 has a surface asperities structure. The second insulating layer 14, which has a surface asperities structure, may be formed from photosensitive resin as described, for example, in Japanese Patent No. 3394926.

The reflecting layer 12 is provided over the second insulating layer 14. The reflecting layer 12 is formed from a high-reflectance metallic material. Usable examples of the metallic material from which the reflecting layer 12 is formed include aluminum, silver, and a silver alloy.

The reflecting layer 12 has asperities on a surface thereof in conformance with the surface asperities structure of the second insulating layer 14. That is, the reflecting layer 12 too has a surface asperities structure. The surface asperities structure of the reflecting layer 12 is also called "MRS (Micro Reflective Structure), which is provided to achieve a near-paper-white display by diffusely reflecting ambient light. The surface asperities structure may be constituted, for example, by a plurality of projections p randomly arranged so that the center-to-center spacing between adjacent ones of the projections p is greater than or equal to 5 µm to less than or equal to 50 µm, preferably greater than or equal to 10 µm to less than or equal to 20 µm. When seen from a direction normal to a display surface, each of the projections p has a substantially circular shape or a substantially polygonal shape. The area of projections p in a pixel P ranges, for example, from approximately 20% to approximately 40%. The height of each of the projections p is for example greater than or equal to 1 µm and less than or equal to 5 µm.

The reflecting layer 12 includes a first portion 12a located in the reflection region Rf of each pixel P and a second portion 12b located between any two pixels P that are adjacent to each other. The surface asperities structure of the reflecting layer 12 is formed in both the first portion 12a and the second portion 12b. That is, the second portion 12b as well as the first portion 12a has the surface asperities structure.

It should be noted that the reflecting layer 12 may not have the surface asperities structure (i.e. may have a flat mirror finished surface). In a case where the reflecting layer 12 does not have the surface asperities structure, a near-paper-white display can be achieved by using a combination of the reflecting layer 12 and a light scattering layer.

The first insulating layer 13 is provided so as to cover the reflecting layer 12. The first insulating layer 13 is a transparent insulating layer formed, for example, from a transparent organic insulating material. The first insulating layer 13 has a concave portion (transmission aperture groove) formed therein by a photolithography process to make the transmission cell gap dt greater than the reflection cell gap dr.

The pixel electrode 11 is provided on top of the first insulating layer 13. That is, the pixel electrode 11 is provided over the reflecting layer 12 with the first insulating layer 13 sandwiched therebetween. The pixel electrode 11 is formed from a transparent conductive material. A usable example of the transparent conductive material is indium tin oxide (ITO), indium zinc oxide (IZO (registered trademark)), or a mixture thereof. The pixel electrode 11 is electrically connected to the backplane circuit.

The contact portion CP electrically connects the pixel electrode 11 to the backplane circuit through a first contact hole CH1 formed in the first insulating layer 13 and a second contact hole CH2 formed in the second insulating layer 14. The first contact hole CH1 and the second contact hole CH2 are formed, for example, by a photolithography process. In the illustrated example, the contact portion CP is composed of a first contact electrode ce1, a second contact electrode ce2, and a third contact electrode ce3.

The first contact electrode ce1 is an electrode (or part of a wire) exposed into the second contact hole CH2. The first contact electrode ce1 is formed, for example, from the same conductive film (i.e. a metallic film of aluminum, copper, or other metals) as the source wire of the backplane circuit.

The second contact electrode ce2 is a transparent contact electrode formed from a transparent conductive material (e.g. indium tin oxide or indium zinc oxide). The second contact electrode ce2 includes a portion located in the second contact hole CH2, and is in contact with the first contact electrode ce1 in the second contact hole CH2.

The third contact electrode ce3 is a reflecting contact electrode formed at the same layer as the reflecting layer 12 (i.e. from the same reflecting film as the reflecting layer 12) so as to make contact with the second contact electrode (transparent contact electrode) ce2. The third contact electrode ce3 includes a portion overlapping the first contact hole CH1. The pixel electrode 11 is in contact with the third contact electrode ce3 in the first contact hole CH1, and is electrically connected to the backplane circuit via the contact portion CP.

The inclusion of the reflecting contact electrode ce3 by the contact portion CP makes it possible to avoid an adverse effect on the quality of a transmission display by an alignment defect having occurred near the first contact hole CH1, as the reflecting contact electrode ce3 functions as a light-blocking layer against light from the backlight BL.

In the illustrated example, a transparent conductive layer 19 formed from the same conductive film as the second contact electrode ce2 (i.e. at the same layer as the second contact electrode ce2) is sandwiched between the reflecting layer 12 and the second insulating layer 14. The transparent conductive layer 19 may be omitted.

The counter substrate 20 includes a counter electrode 21, a color filter layer 22, and a second alignment film 25. The counter substrate 20 further includes a plurality of columnar spacers (not illustrated). The constituent elements (such as the aforementioned counter substrate 21) of the counter electrode 20 is supported by a transparent substrate 20a. The transparent substrate 20a may be made of a material such as alkali-free glass or plastic. It should be noted that the counter substrate 20 does not have a black matrix (light-blocking layer) between any two pixels P that are adjacent to each other.

The counter electrode 21 is provided so as to face the pixel electrode 11. The counter electrode 21 is formed from a transparent conductive material. As the transparent conductive material from which the counter electrode 21 is formed, a material that is similar to that from which the pixel electrode 11 is formed may be used. To the reflecting layer 12, for example, a potential that is the same as a potential (common potential) that is applied to the counter electrode 21 is applied.

The color filter layer 22 typically includes a red color filter disposed in the red pixel, a green color filter disposed in the green pixel, and a blue color filter disposed in the blue pixel. A region of the color filter layer 22 that corresponds to the space between pixels P of different colors is substantially equally divided by color filters of different colors. An overcoat layer may be formed so as to cover the color filter layer 22.

The columnar spacers define the thickness (cell gap) of the liquid crystal layer 30. The columnar spacers may be formed from photosensitive resin.

The liquid crystal layer 30 contains a (negative) nematic liquid crystal material whose dielectric anisotropy is negative, and does not contain a chiral agent. The liquid crystal layer 30 may be formed, for example, by a falling-drop method.

The first alignment film 15 and the second alignment film 25 are each provided so as to make contact with the liquid crystal layer 30. Note here that the first alignment film 15 and the second alignment film 25 are each a vertical alignment film. The "vertical alignment film" herein needs only be one that causes liquid crystal molecules near the alignment film to be aligned substantially perpendicular to a surface of the alignment film, and may for example be an alignment film that gives liquid crystal molecules a pretilt angle greater than or equal to 86.0 degrees. It is preferable that a major ingredient of the vertical alignment film be polyimide, polyamic acid, or polysiloxane. These are a group of polymers that can be effectively utilized as alignment films.

At least either the first alignment film 15 or the second alignment film 25 is subjected to an alignment process, and defines a pretilt orientation. As the alignment process, a rubbing process or a photo-alignment process may be used. An alignment film having a liquid-crystal-molecule alignment restraining force whose strength and direction change due to the photo-alignment process (photoirradiation/exposure) is called "photo-alignment film". It is preferable that the photo-alignment film contains, as a photoreactive functional group, at least one of a cinnamate group, an azobenzene group, a chalcone group, a stilbene group, and a coumarin group. This reduces the risk of a Photolysis products being eluated into the liquid crystal layer 30, thus brining about improvement in reliability and making it possible to execute the photo-alignment process with comparatively low irradiation energy.

The liquid crystal molecules of the liquid crystal layer 30 are vertically aligned in a state where no voltage is applied to the liquid crystal layer 30, and are horizontally aligned in a state where a predetermined voltage is applied to the liquid crystal layer 30. In the present embodiment, the twist angle of the liquid crystal layer 30 is substantially 0 degree, so that a display is carried out in a VA-ECB (vertical aligned electrically controlled birefringence) mode. It should be noted that "twist angle is substantially 0 degree" connotes a case where the twist angle is close to 0 degree within the margin of manufacturing error.

As the liquid crystal layer 30, one that contains a (positive) nematic liquid crystal material whose dielectric anisotropy is positive may be used. In that case, horizontal alignment films are used as the first alignment film 15 and the second alignment film 25, and an ECB mode is employed as a display mode.

The liquid crystal display device 100 further includes a pair of circularly polarizing plates 40A and 40B. Of the two circularly polarizing plates 40A and 40B, the first circularly polarizing plate 40A is disposed at the back of the liquid crystal display panel LP, and the second circularly polarizing plate 40B is disposed at a side of the liquid crystal panel LP that faces toward the viewer. The first circularly polarizing plate (back circularly polarizing plate) 40A includes a first linearly polarizing plate 41A and a first phase difference plate 42A located between the first linearly polarizing plate 41A and the liquid crystal display panel LP. The second circularly polarizing plate (front circularly polarizing plate) 40B includes a second linearly polarizing plate 41B and a second phase difference plate 42B located between the second linearly polarizing plate 41B and the liquid crystal display panel LP.

The second linearly polarizing plate (front linearly polarizing plate) 41B is an absorptive linearly polarizing plate. A usable example of the absorptive linearly polarizing plate is a linearly polarizing plate, a dyed polarizing plate, or a coated polarizing plate composed of a film polarizer obtained by dying and drawing polyvinyl alcohol (PVA) and a triacetyl cellulose (TAC) protecting layer. The absorptive linearly polarizing plate has a transmission axis and an absorption axis that is orthogonal to the transmission axis.

As is the case with the front linearly polarizing plate 41B, an absorptive linearly polarizing plate may be used as the first linearly polarizing plate (back linearly polarizing plate) 41A. Alternatively, a reflective linearly polarizing plate or a laminated body of an absorptive linearly polarizing plate and a reflective linearly polarizing plate may be used. Examples of the reflection linearly polarizing plate include a multilayer reflective polarizing plate (commercially available as "DBEF") manufactured by 3M Japan Limited and a combination of a cholesteric liquid crystal film and a quarter-wavelength plate. Unlike the absorptive linearly polarizing plate, the reflective linearly polarizing plate has a reflection axis in a direction orthogonal to a transmission axis. Therefore, a portion of the light from the backlight BL is recycled by being reflected off the reflective linearly polarizing plate and being further reflected off a reflecting plate 53 included in the backlight BL. It should be noted that the reflective linearly polarizing plate may be included not in the back linearly polarizing plate 41A but in the backlight BL.

The first phase difference plate 42A and the second phase difference plate 42B may each be one quarter-wavelength plate, a combination of one quarter-wavelength plate and two half-wavelength plates, or a combination of one quarter-wavelength plate and one negative C-plate.

The orientations of the absorption axes of the back linearly polarizing plate 41A and the front linearly polarizing plate 41B and the orientations of the delay axes of the first phase difference plate 42A and the second phase difference plate 42B are set so that a display is carried out in a normally black mode. The liquid crystal molecules of the liquid crystal layer 30 are vertically aligned in a black display state, and are slanted at a twist angle of 0 degree in a white display state (and a halftone display state).

The backlight BL is disposed at the back of the back circularly polarizing plate 40A. The backlight BL includes a light source (e.g. an LED) 51 that emits light, a light guide plate 52 that guides the light from the light source 51 toward the liquid crystal display panel LP, and a reflecting plate 53 disposed at the back of the light guide plate 52. Further, the backlight BL may further include a prism sheet and a diffusion sheet disposed at the front (or the back) of the light guide plate 52.

In the present embodiment, a surface of the TFT substrate 10 that faces the liquid crystal layer 30 has a step including an upper step portion P1, a lower step portion P2, and an inclined portion P3. The upper step portion P1 is located in at least the reflection region Rf, and is substantially flat. The lower step portion P2 is located in at least the transmission region Tr, and is substantially flat. The inclined portion P3 is a portion connecting the upper step portion P1 with the lower step portion P2, and is inclined with respect to a substrate surface of the transparent substrate 10a.

As mentioned above, the liquid crystal display device 100 according to the present embodiment has a double-electrode structure in which the reflecting layer (reflecting electrode) 12 and the pixel electrode 11 are separated from each other by the first insulating layer 13. Therefore, the reflecting layer 12 may include not only a first portion 12a located in a pixel P but also a second portion 12b located between two adjacent pixels P. Accordingly, a region between pixels P can contribute to a reflection display. This brings about improvement in reflection aperture ratio (i.e. the proportion of a region in a display region that contributes to a reflection-mode display), making it possible to bring about further improvement in reflectance. Therefore, a brighter display can be carried out in a reflection mode. Further, since the surface asperities structure of the reflecting layer 12 is planarized by the first insulating layer 13 formed under the pixel electrode 11, there occurs no turbulence in alignment due to the surface asperities structure of the reflecting layer 12. This gives alignment with high in-plane uniformity.

In the liquid crystal display device 100 according to the present embodiment, in which a region between pixels P contributes to a reflection-mode display, it is preferable that the counter substrate 20 not have a black matrix between any two of the plurality of pixels P that are adjacent to each other.

Further, in the liquid crystal display device 100 according to the present embodiment, the transmission cell gap dt is greater than the reflection cell gap dr. That is, the liquid crystal display device 100 has a multiple-gap structure.

Whereas light that is used for a transmission-mode display passes through the liquid crystal layer 30 only once, light that is used for a reflection-mode display passes through the liquid crystal layer 30 twice. Therefore, making the cell gap dt of the transmission region Tr greater than the cell gap dr of the reflection region Rf as in the case of the present embodiment makes it possible to increase a retardation of the liquid crystal layer 30 with respect to light that is used for a transmission-mode display, giving a voltage-luminance characteristic that is favorable to the transmission region Tr (i.e. that makes it possible to achieve a brighter display).

The inventors studied and found that a yellow shift in reflection whiteness occurs in a semi-transmissive liquid crystal display device having a double-electrode structure and a multiple-gap structure. On the other hand, the liquid crystal display device 100 according to the present embodiment reduces a yellow shift in reflection whiteness by having the following configuration.

In the present embodiment, when seen from a direction normal to the display surface, the length L1 of a portion of the inclined portion P3 included in the reflection region Rf and the length L2 of a portion of the lower step portion P2 included in the reflection region Rf satisfy the relationship L1+L2≤1.81·L1. Note here that the length L1 and the length L2 are defined in a direction in which the upper step portion P1, the inclined portion P3, and the lower step portion P2 are arranged. Satisfying the aforementioned relationship reduces a yellow shift in reflection whiteness. In the following, this point is explained in more concrete terms by taking, as examples, liquid crystal display devices 100A, 100B, and 100C of Examples 1, 2, and 3 shown in FIGS. 3, 4, and 5 and a liquid crystal display device 900A of Comparative Example 1 shown in FIG. 6. FIGS. 3, 4, 5, and 6 are cross-sectional views schematically showing the liquid crystal display devices 100A, 100B, 100C, and 900A, respectively. It should be noted that FIGS. 3, 4, 5, and 6 omit to illustrate some constituent elements.

Figure 3:
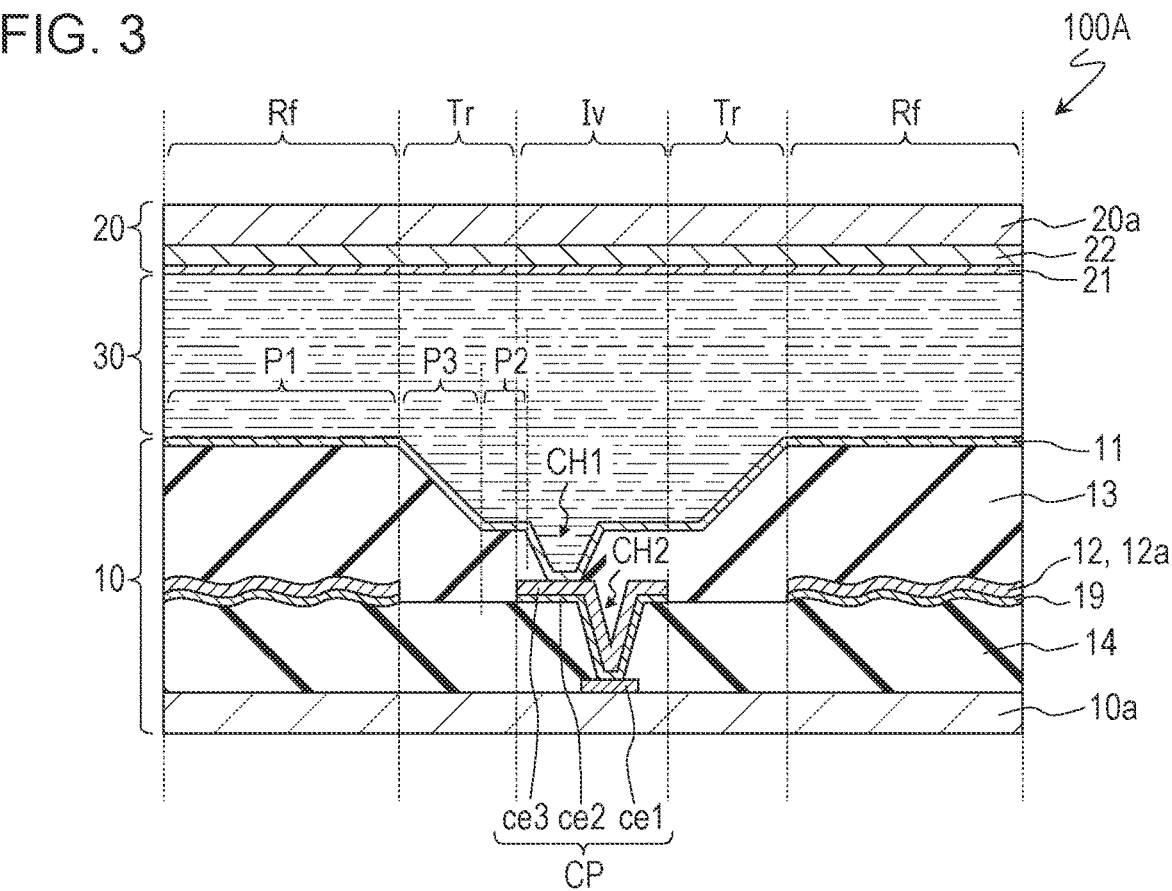
FIG. 3 is a cross-sectional view schematically showing a liquid crystal display device of Example 1.
Figure 4:
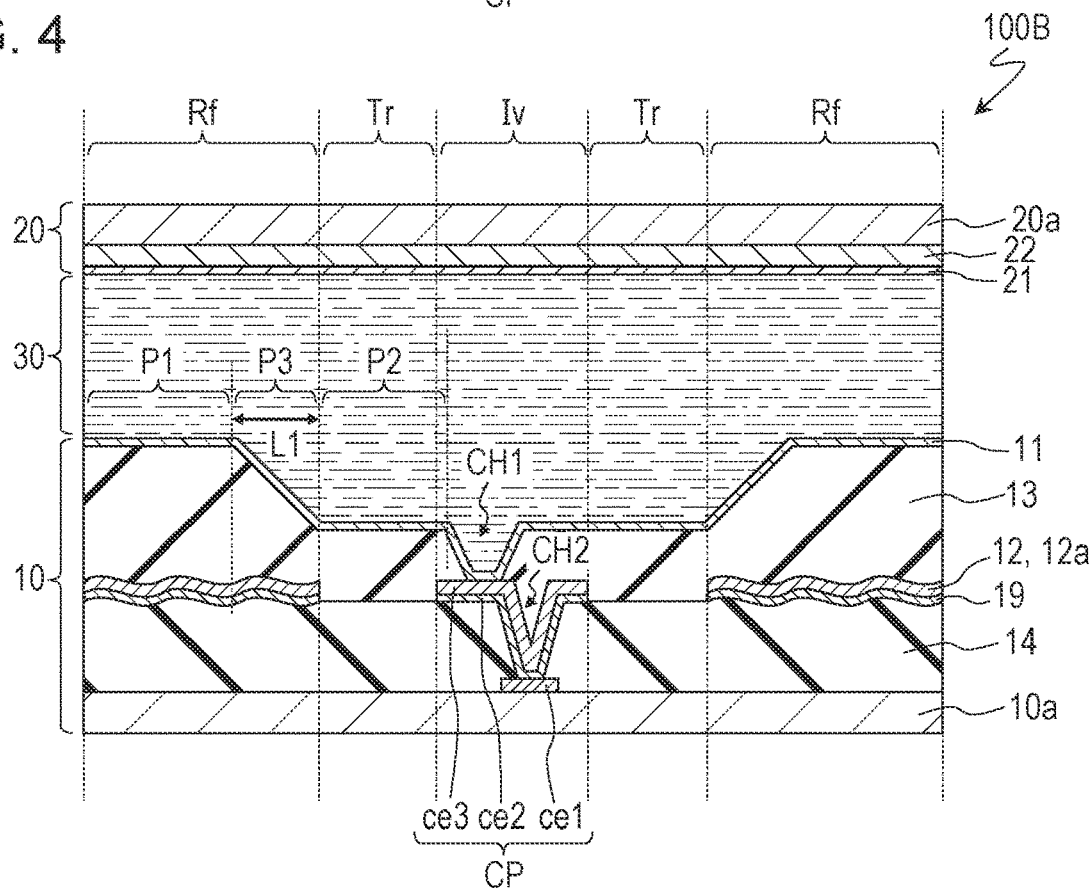
FIG. 4 is a cross-sectional view schematically showing a liquid crystal display device of Example 2.

In the liquid crystal display device 100A of Example 1 shown in FIG. 3, the inclined portion P3 and the lower step portion P2 are not included in the reflection region Rf. The inclined portion P3 is present only in the transmission region Tr, and the lower step portion P2 is present in the transmission region Tr and the invalid region Iv. Therefore, the length L1 of a portion of the inclined portion P3 included in the reflection region Rf and the length L2 of a portion of the lower step portion P2 included in the reflection region Rf are both 0, so that the relationship L1+L2≤1.81·L1 is satisfied.

The liquid crystal display device 100A of Example 1 has the following specifications:
Reflecting layer 12, third contact electrode ce3: silver alloy layers
Transparent conductive layer 19, pixel electrode 11, second contact electrode ce2: ITO layers
First contact electrode ce1: metallic layer
First insulating layer 13, second insulating layer 14: organic insulating layers
Invalid region Iv (contact hole region): having the shape of a square measuring 9 μm per side; shielded from light by the third contact electrode ce3 (silver alloy layer)
Transmission region Tr: region formed by removing the invalid region Iv from a region having the shape of a square measuring 18 μm per side
Reflection region Rf: region formed by removing the transmission region Tr and the invalid region Iv from a region having the shape of a square measuring 41 μm per side
Liquid crystal layer 30: negative liquid crystal material, containing a chiral agent
Display mode: VA-ECB mode; twist angle of 0 degree
Reflection cell gap dr: 2.0 μm
Transmission cell gap dt: varies from 2.0 to 3.5 μm
Counter electrode 21: ITO layer
Transparent substrates 10a and 20a: alkali-free glass substrates
Back and front polarizing plates: circularly polarizing plates each formed by a combination of a linearly polarizing plate and a phase difference plate
Backlight BL: LED backlight In the liquid crystal display device 100B of Example 2 shown in FIG. 4, the inclined portion P3 is at least partially included in the reflection region Rf, and the lower step portion P2 is not included in the reflection region Rf. In the illustrated example, the inclined portion P3 is present only in the reflection region Rf, and the lower step portion P2 is present in the transmission region Tr and the invalid region Iv. Therefore, the length L2 of a portion of the lower step portion P2 included in the reflection region Rf is 0, so that the relationship L1+L2≤1.81·L1 is satisfied.

The liquid crystal display device 100B of Example 2 has the same specifications as the liquid crystal display device 100A of Example 1 except that the reflection cell gap dr varies from 2.0 to 3.5 μm and the transmission cell gap dt is 3.5 μm.

Figure 5:
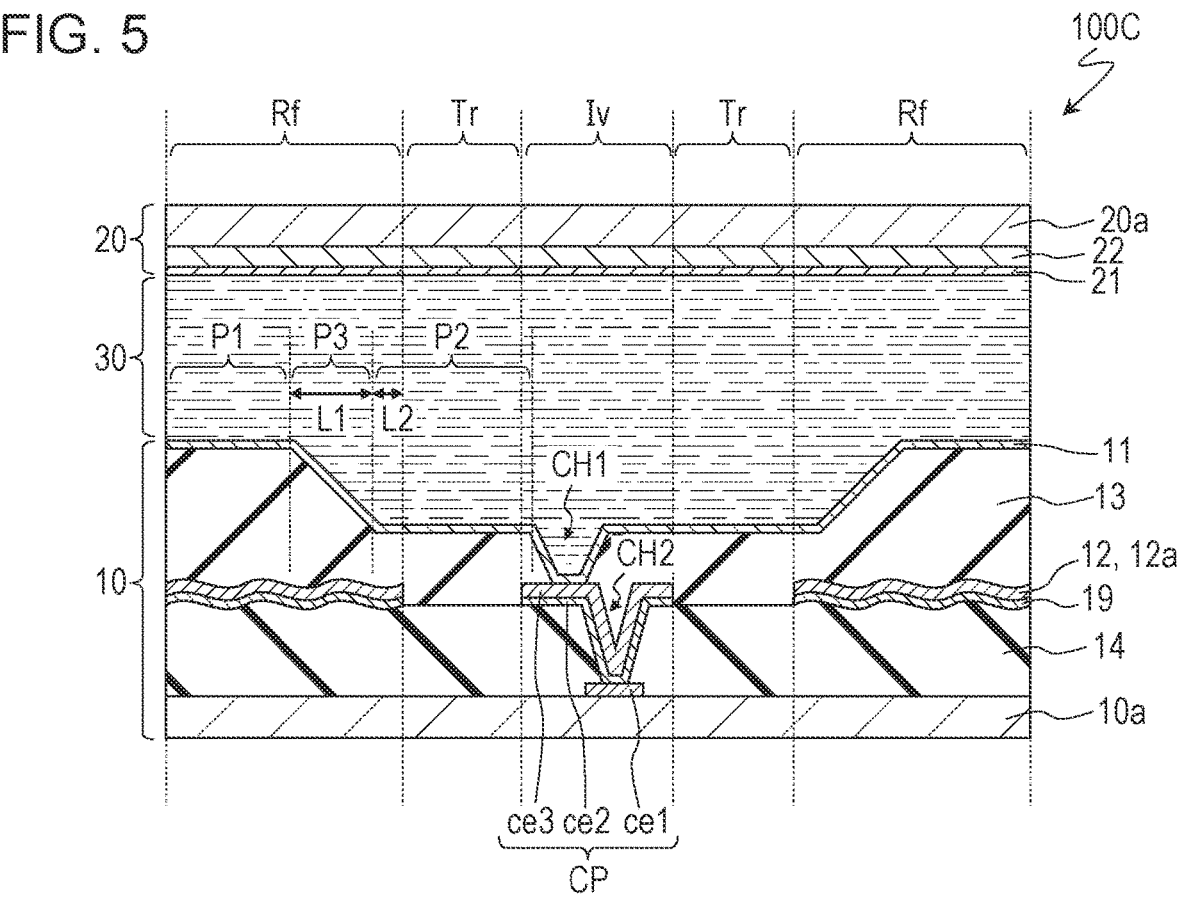
FIG. 5 is a cross-sectional view schematically showing a liquid crystal display device of Example 3.

In the liquid crystal display device 100C shown in FIG. 5, the whole of the inclined portion P3 and part of the lower step portion P2 are included in the reflection region Rf. The inclined portion P3 is present only in the reflection region Rf, and the lower step portion P2 is present in the reflection region Rf, the transmission region Tr, and the invalid region Iv. The length L2 of a portion of the lower step portion P2 included in the reflection region Rf is less than the length L1 of a portion of the inclined portion P3 included in the reflection region Rf, more specifically at most 0.81 times greater than the length L1. Therefore, the relationship L1+L2≤1.81·L1 is satisfied.

The liquid crystal display device 100C of Example 3 has the same specifications as the liquid crystal display device 100A of Example 1 except that the reflection cell gap dr varies from 2.0 to 3.5 μm and the transmission cell gap dt is 3.5 μm.

Figure 6:
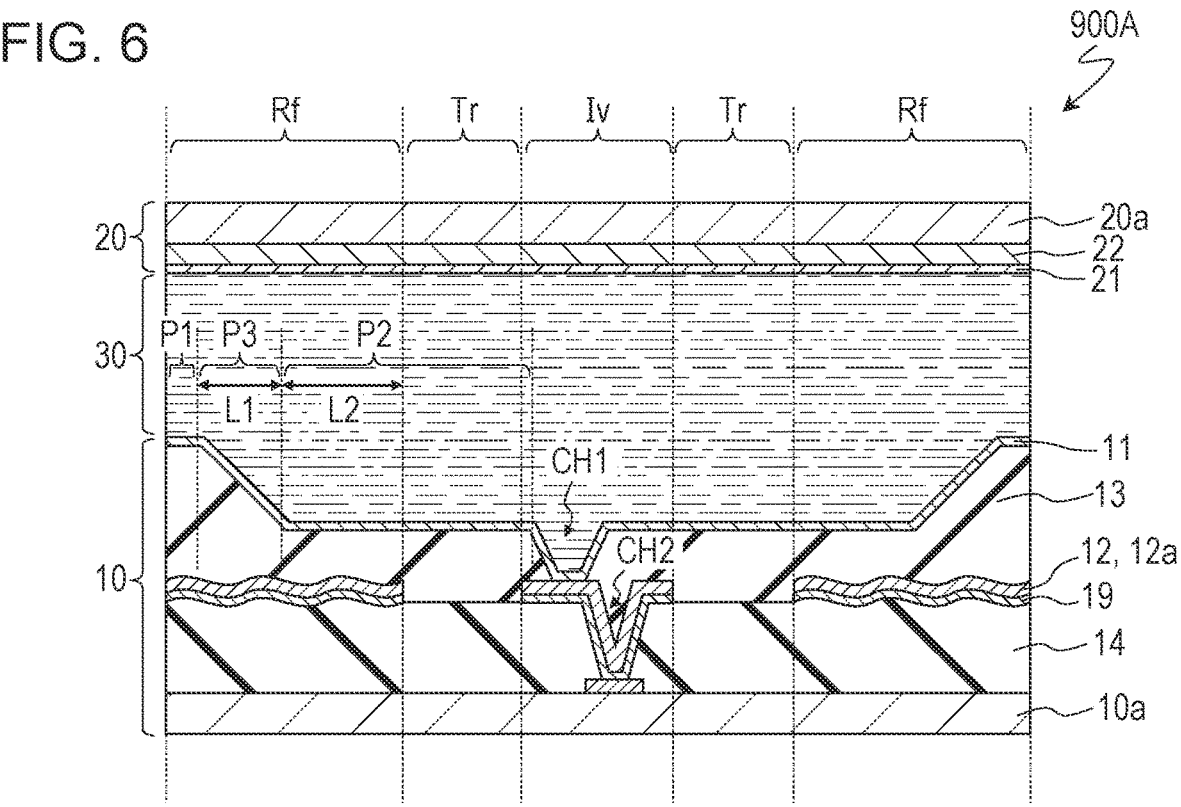
FIG. 6 is a cross-sectional view schematically showing a liquid crystal display device of Comparative Example 1.

In the liquid crystal display device 900A of Comparative Example 1 shown in FIG. 6 too, the surface of the TFT substrate 10 that faces the liquid crystal layer 30 has a step including an upper step portion P1, a lower step portion P2, and an inclined portion P3, and the whole of the inclined portion P3 and part of the lower step portion P2 are included in the reflection region Rf. Note, however, that the length L2 of a portion of the lower step portion P2 included in the reflection region Rf is greater than the length L1 of a portion of the inclined portion P3 included in the reflection region Rf. Therefore, the relationship L1+L2≤1.81·L1 is not satisfied.

The liquid crystal display device 900A of Comparative Example 1 has the same specifications as the liquid crystal display device 100A of Example 1 except that the reflection cell gap dr varies from 2.0 to 3.5 μm and the transmission cell gap dt is 3.5 μm.

The inventors focused attention on an effect on reflection whiteness by a total CL of the length L1 of a portion of the inclined portion P3 included in the reflection region Rf and the length L2 of a portion of the lower step portion P2 included in the reflection region Rf (the total being hereinafter sometimes referred to as "concave length" of the reflection region Rf, as it is the length of a region concaved in the reflection region Rf).

Figure 7:
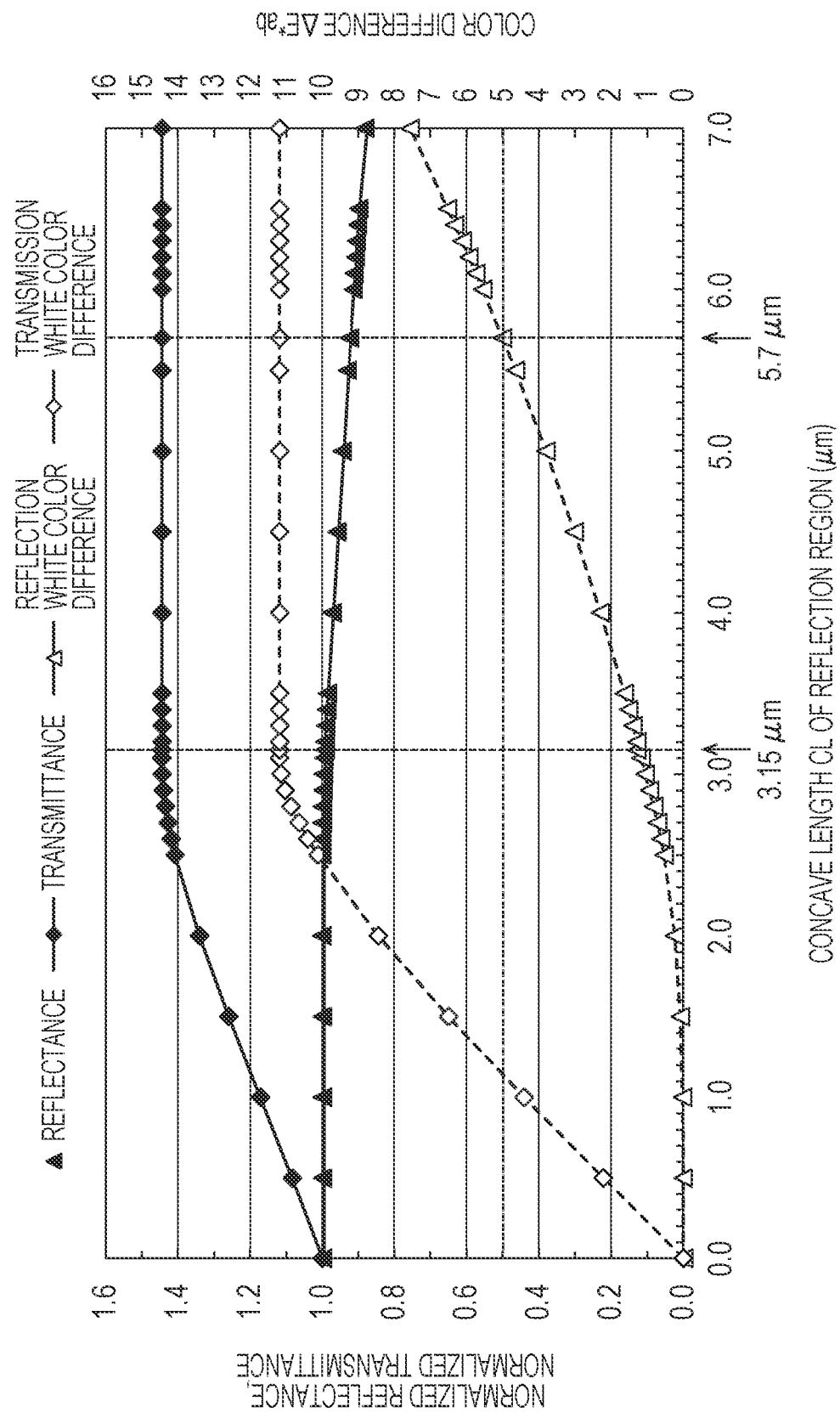
FIG. 7 is a graph showing results of simulated calculations of changes in reflectance and transmittance and in reflection white color difference and transmission white color difference according to the dimensions of the concave length of a reflection region.
Figure 8:
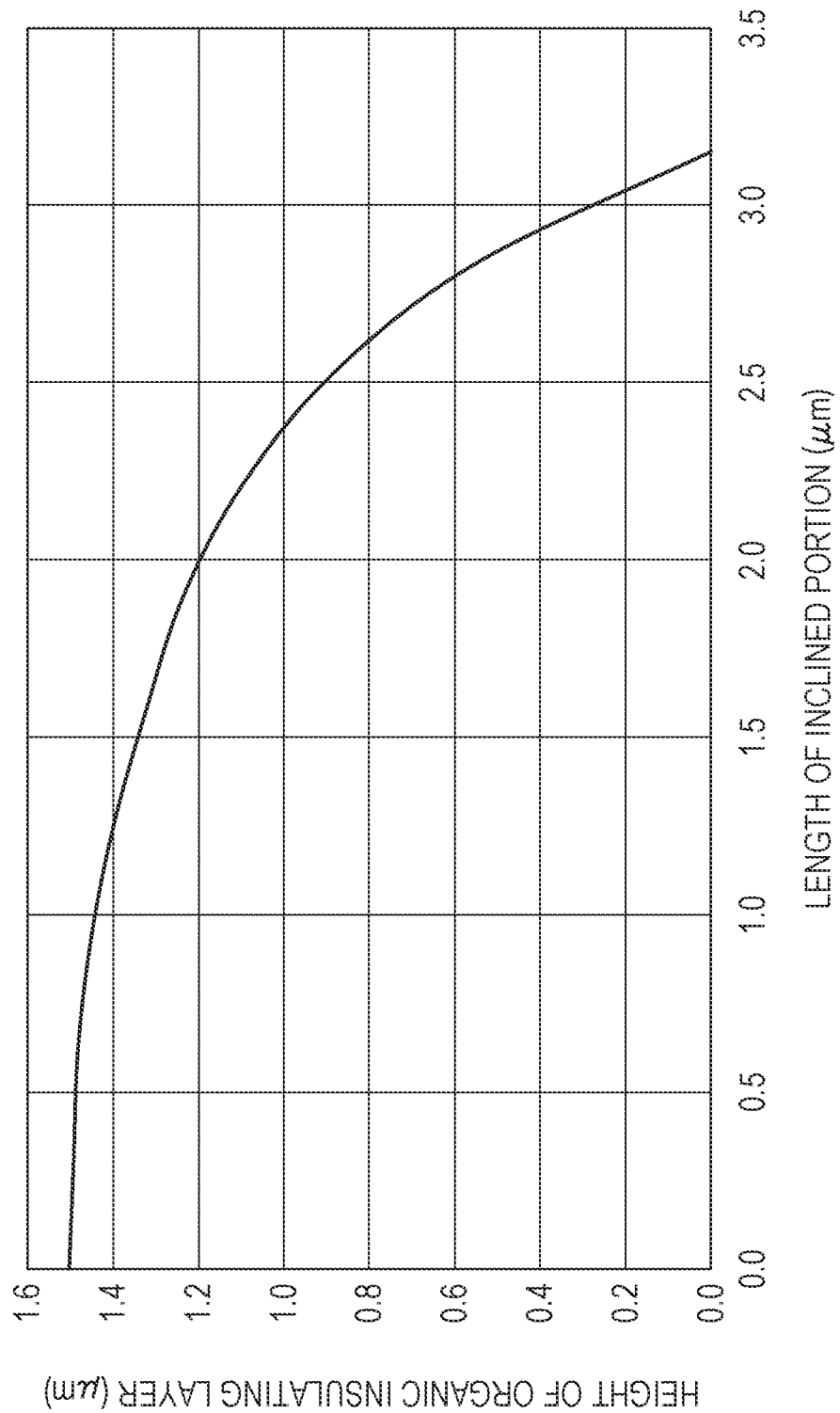
FIG. 8 is a graph showing the actual shape of an inclined portion of a groove formed in an organic insulating layer having a thickness of 1.5 μm.

FIG. 7 and Table 1 show results of simulated calculations of changes in reflectance and transmittance and in reflection white color difference and transmission white color difference according to the dimensions of the concave length CL of the reflection region Rf. The simulated calculations were performed by a liquid crystal simulator (SHINTECH's LCD master) using the actually measured area ratio between the reflection region Rf and the transmission region Tr (reflection region Rf: 76.5%, transmission region Tr: 14.3%) and the actual shape, which is shown in FIG. 8, of an inclined portion of a groove (which corresponds to the transmission aperture groove) formed in an organic insulating layer having a thickness of 1.5 μm.

are normalized by values assumed in a case (Example 1) where the concave length CL is 0.0 μm. Further, the reflection white color difference and the transmission white color difference represent color differences from white as made by a reflection display and a transmission display of Example 1. As the color differences, specifically, color differences ΔE*ab in the L*a*b* color system were calculated. The color differences ΔE*ab are color differences that are defined by ΔL*, Δa*, and Δb* that are the differences between the coordinates L*, a*, and b* of two samples in the L*a*b* color space (CIE 1976). The color differences ΔE*ab are expressed by the following formula. A description of a specific method for calculating the chromaticity coordinates is omitted, as the method is well known to persons skilled in the art.

$$\Delta E^* ab = [(\Delta L^*)^2 + (\Delta a^*)^2 + (\Delta b^*)^2]^{1/2}$$

$$\Delta L^* = L_1^* - L_2^*$$

$$\Delta a^* = a_1^* - a_2^*$$

$$\Delta b^* = b_1^* - b_2^*$$

The tolerance range (color tolerance) for color differences ΔE*ab was judged by the classification of color tolerance, shown in Table 2, which is in common use at JIS regulation or in a variety of industries.

TABLE 2

| Magnitude of color difference | Designation | Remarks |
|---|---|---|
| 0.2 and under | A valuative level | |

TABLE 1

| | Concave length CL [μm] | Normalized reflectance | Reflection whiteness x | Reflection whiteness y | Reflection white color difference ΔE*ab | Normalized transmittance | Transmission whiteness x | Transmission whiteness y | Transmission white color difference ΔE*ab |
|---|---|---|---|---|---|---|---|---|---|
| Example 1 | 0.00 | 1.00 | 0.314 | 0.349 | 0.0 | 1.00 | 0.267 | 0.253 | 0.0 |
| — | 1.00 | 1.00 | 0.314 | 0.349 | 0.0 | 1.17 | 0.272 | 0.261 | 4.4 |
| — | 1.50 | 1.00 | 0.314 | 0.349 | 0.1 | 1.26 | 0.274 | 0.265 | 6.5 |
| — | 2.00 | 1.00 | 0.314 | 0.349 | 0.2 | 1.34 | 0.277 | 0.269 | 8.4 |
| Example 2 | 3.15 | 0.99 | 0.317 | 0.352 | 1.3 | 1.44 | 0.281 | 0.275 | 11.2 |
| Example 3 | 4.00 | 0.97 | 0.320 | 0.354 | 2.3 | 1.44 | 0.281 | 0.275 | 11.2 |
| — | 5.00 | 0.95 | 0.324 | 0.356 | 3.8 | 1.44 | 0.281 | 0.275 | 11.2 |
| — | 5.70 | 0.92 | 0.327 | 0.358 | 5.0 | 1.44 | 0.281 | 0.275 | 11.2 |
| — | 6.00 | 0.92 | 0.329 | 0.359 | 5.6 | 1.44 | 0.281 | 0.275 | 11.2 |
| Comparative Example 1 | 7.00 | 0.88 | 0.334 | 0.362 | 7.6 | 1.44 | 0.281 | 0.275 | 11.2 |

In FIG. 7, a case where the concave length CL of the reflection region Rf is 0.0 μm corresponds to Example 1, a case where the concave length CL is 3.15 μm to Example 2, a case where the concave length CL is 4.0 μm to Example 3, and a case where the concave length CL is 7.0 μm to Comparative Example 1. In a case where the concave length CL is 0.0 μm, the reflection cell gap dr is 2.0 μm all over the reflection region Rf. As the concave length Cl increases, the reflection cell gap dr partially changes from 2.0 μm to 3.5 μm according to a change in thickness of the inclined portion of the organic insulating layer shown in FIG. 8.

FIG. 7 shows, as a reflectance and a transmittance, a normalized reflectance and a normalized transmittance that TABLE 2-continued

| Magnitude of color difference | Designation | Remarks |
|---|---|---|
| 0.3 | Discernable color difference | Precision of colorimetric color reproducibility of identical objects |
| 0.6 | Grade 1 (strict color difference) | This is the limit of practical tolerance, if various error factors are taken into consideration. |

TABLE 2-continued

| Magnitude of color difference | Designation | Remarks |
|---|---|---|
| 1.2 | Grade 2 (practical color difference a) | Most people can tell the color difference, if samples are put side by side. Munsell Grade AAA, OD color of Defense Agency |
| 2.5 | Grade 3 (practical color difference b) | Colors of this range are regarded as the same colors, if judged from a distance. Munsell Grade AA, JIS standard color chips |
| 5.0 | Grade 4 | Colors of this range are regarded as the same colors, if compared over time. Munsell Grade A |
| 10.0 | Grade 5 | Marking pens (JIS S 6037-1992) |
| 20.0 | Grade 6 | Management of colors by color name General rules of coating films for automobile parts (JIS D 0202-1988) Railway crossing equipment -- Safety color code (JIS E 3701-1984) Stamp pads (JIS S 6016-1991) Leads for pencils, colored pencils, and mechanical pencils (JIS S 6005-1992) Principles for use of safety colors (JIS Z 9101-1986) Identification marking for piping systems (JIS Z 9102-1987) Aerospace -- Pipelines -- Identification (JIS W 0601-1990) |

As shown in FIG. 7, as the concave length CL increases beyond 3.15 μm (Example 2, in which the whole of the inclined portion P3 is included in the reflection region Rf), the reflectance slowly decreases. Further, the reflection white color difference gradually increases when the concave length CL exceeds 1.5 μm, and the reflection white color difference increases at a higher rate as the concave length CL increases. Further, as shown in Table 1, an increase in the reflection white color difference causes the reflection whiteness to shift toward yellow. Further, the transmittance and the transmission white color difference increase as the concave length CL increases, but the transmittance and the transmission white color difference become steady once the concave length CL exceeds 3.15 μm, as there is no change in the transmission cell gap dt from then on.

In the embodiment of the present disclosure, "Magnitude of color difference of 5.0 (Colors of this range are regarded as the same colors, if compared over time)" in the classification of color tolerance of Table 2 was set as an upper acceptance value of the color tolerance for reflection white color differences. Accordingly, in the example shown in FIG. 7, the concave length CL needs only be less than or equal to 5.7 μm. In a case where the concave length CL is 5.7 μm, the length L1 of a portion of the inclined portion P3 included in the reflection region Rf is 3.15 μm and the length L2 of a portion of the lower step portion P2 included in the reflection region Rf is 2.55 μm. At this point in time, the length L2 is 0.81 times greater than the length L1. Therefore, making the concave length CL (i.e. the total of the length L1 of a portion of the inclined portion P3 included in the reflection region Rf and the length L2 of a portion of the lower step portion P2 included in the reflection region Rf) at most 1.81 times greater than the length L1 (i.e. causing the relationship L1+L2≤1.81·L1 to be satisfied) makes it possible to reduce a yellow shift in reflection whiteness that is caused by the inclined portion P3 and the lower step portion P2 being included in the reflection region Rf (i.e. the reflection cell gap dr partially becoming too great). Further, at the same time, as shown in FIG. 7 and Table 1, a high reflectance higher than or equal to 90% in a case (Example 1) where the inclined portion P3 and the lower step portion P2 are not included in the reflection region Rf can be maintained.

In cases such as Examples 2 and 3 where the concave length CL is comparatively great, the transmission white color difference takes on a comparatively great value; however, the transmission whiteness does not pose a big problem unlike the reflection whiteness, as the transmission whiteness can be chromatically modulated by controlling the light from the backlight BL.

Embodiment 2

Figure 9:
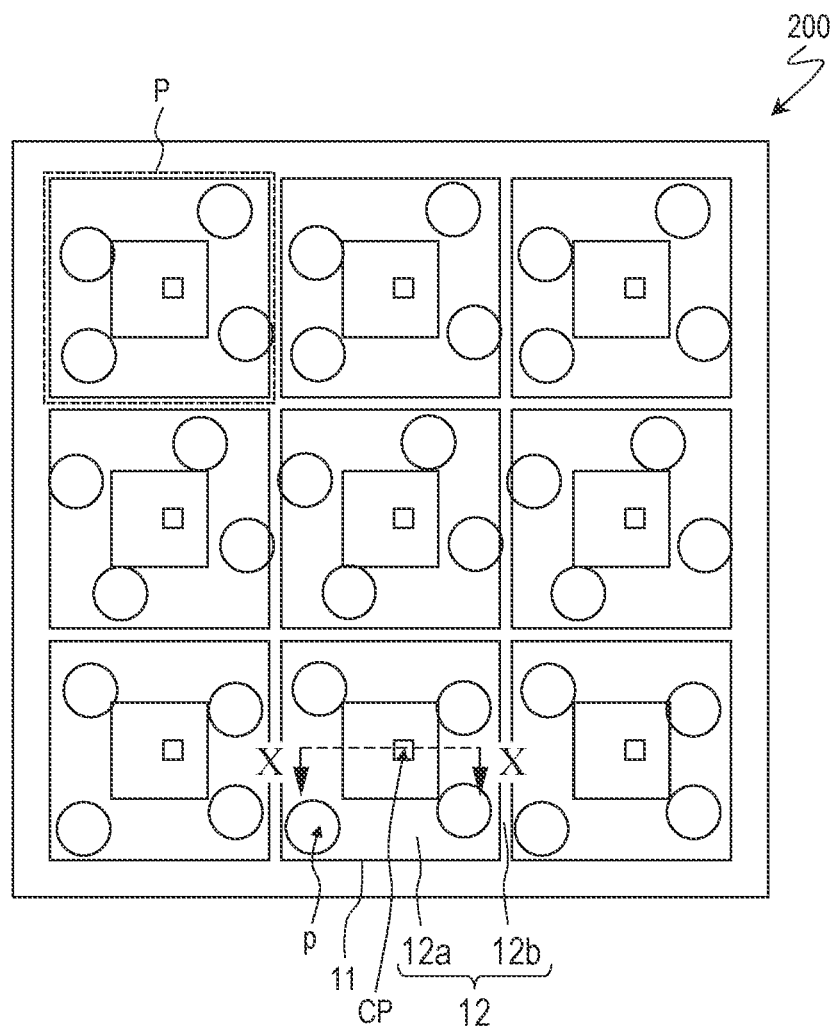
FIG. 9 is a plan view schematically showing another liquid crystal display device according to an embodiment of the present disclosure, showing a region corresponding to nine pixels of the liquid crystal display device.
Figure 10:
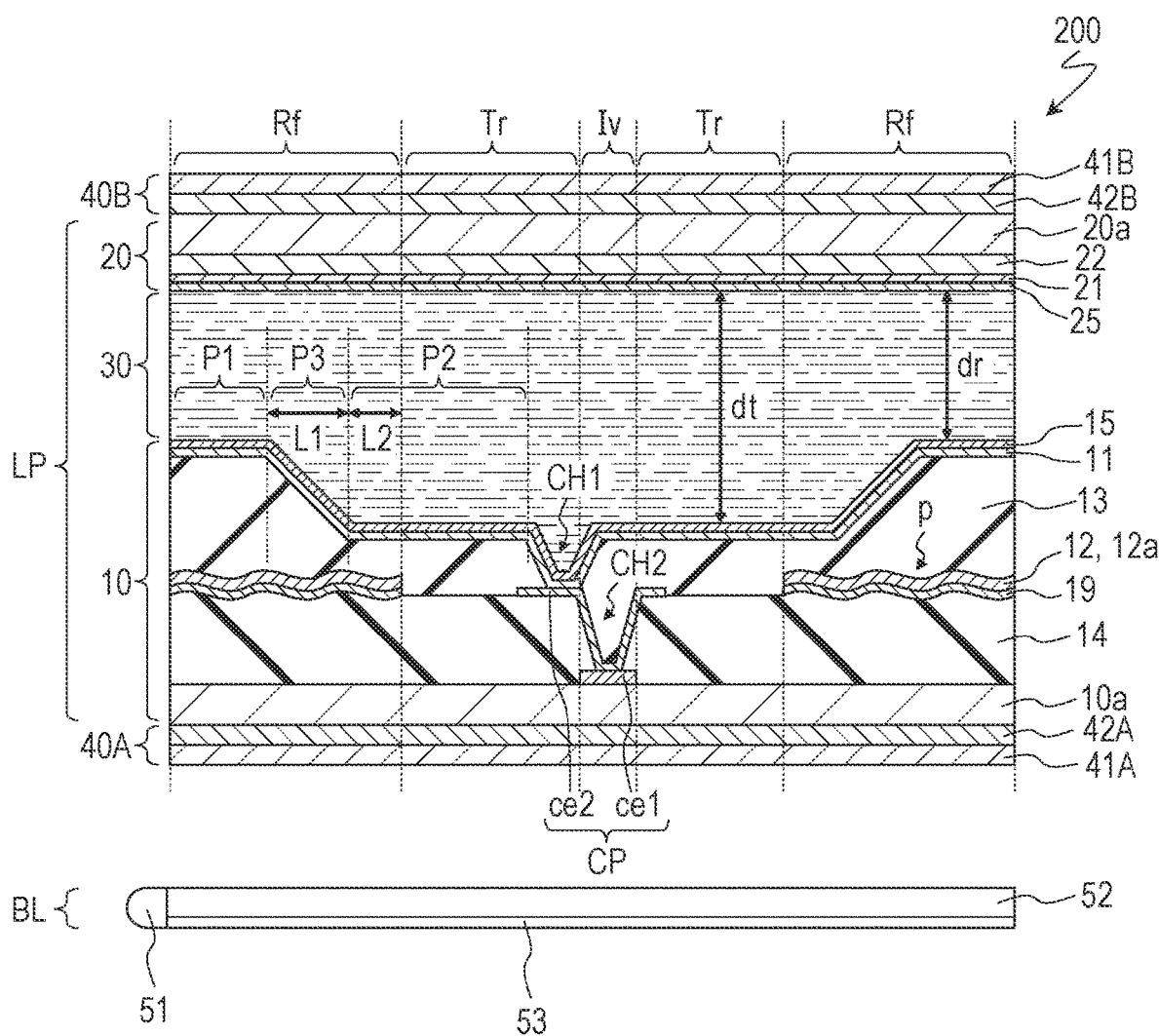
FIG. 10 is a cross-sectional view schematically showing the liquid crystal display device, showing a cross-section structure taken along line X-X in FIG. 9.

A liquid crystal display device 200 according to the present embodiment is described with reference to FIGS. 9 and 10. FIG. 9 is a plan view schematically showing the liquid crystal display device 200, showing a region corresponding to nine pixels P of the liquid crystal display device 200. FIG. 10 is a cross-sectional view schematically showing the liquid crystal display device 200, showing a cross-section structure taken along line X-X in FIG. 9. The following gives a description with a focus on points of difference of the liquid crystal display device 200 according to the present embodiment from the liquid crystal display device 100 according to Embodiment 1.

The liquid crystal display device 200 shown in FIGS. 9 and 10 differs from the liquid crystal display device 100 according to Embodiment 1 in that the contact portion CP does not include an electrode (reflecting contact electrode) formed at the same layer as the reflecting layer 12. That is, the contact portion CP of the liquid crystal display device 200 includes a transparent contact electrode (second contact electrode) ce2 that includes a portion located in the second contact hole CH2 and a portion overlapping the first contact hole CH1, but does not include an electrode formed at the same layer as the reflecting layer 12. The omission of the reflection contact electrode of the contact portion CP reduces the area of a light-blocking layer that shields, from light, regions in which the first contact hole CH1 and the second contact hole CH2 are formed, thus making the invalid region Iv smaller and bringing about improvement in transmittance. Although, in FIG. 10, the invalid region Iv illustrated is a region that is shielded from light by the first contact electrode ce1, the TFT substrate 10 may include a member (such as a gate wire or a source wire) that functions as a light-blocking layer other than the first contact electrode ce1.

In the liquid crystal display device 200 according to the present embodiment too, a yellow shift in reflection whiteness is reduced, as the length L1 of a portion of the inclined portion P3 included in the reflection region Rf and the length L2 of a portion of the lower step portion P2 included in the reflection region Rf satisfy the relationship L1+L2≤1.81·L1. In the illustrated example, the outer shape (i.e. the shape of a boundary with the reflection region Rf) of the transmission region Tr of the liquid crystal display device 200 is identical to the outer shape of the transmission region Tr of the liquid crystal display device 100 according to Embodiment 1. Therefore, the verification results based on the simulated calculations explained in Embodiment 1 are also applicable to the liquid crystal display device 200 according to the present embodiment.

Embodiment 3

Figure 11:
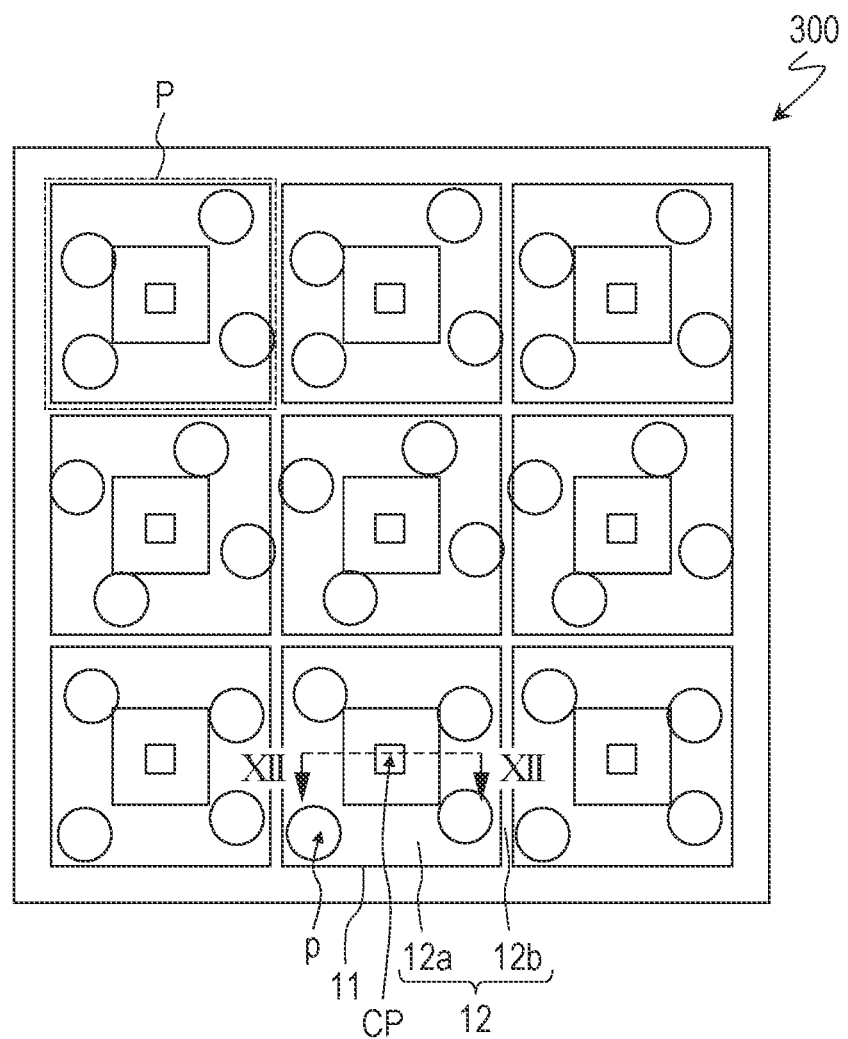
FIG. 11 is a plan view schematically showing still another liquid crystal display device according to an embodiment of the present disclosure, showing a region corresponding to nine pixels of the liquid crystal display device.
Figure 12:
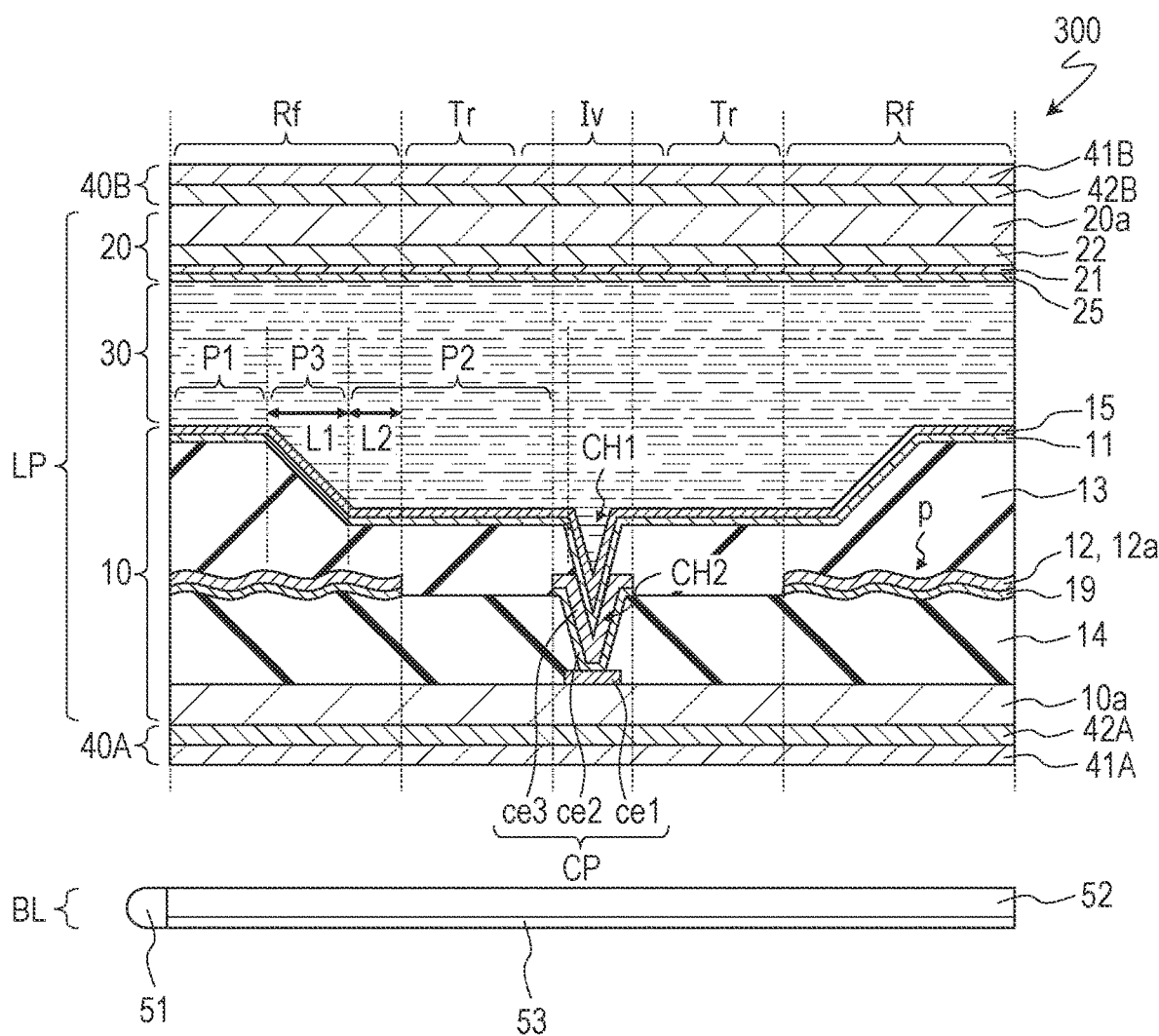
FIG. 12 is a cross-sectional view schematically showing the liquid crystal display device, showing a cross-section structure taken along line XII-XII in FIG. 11.

A liquid crystal display device 300 according to the present embodiment is described with reference to FIGS. 11 and 12. FIG. 11 is a plan view schematically showing the liquid crystal display device 300, showing a region corresponding to nine pixels P of the liquid crystal display device 300. FIG. 12 is a cross-sectional view schematically showing the liquid crystal display device 300, showing a cross-section structure taken along line XII-XII in FIG. 11.

The liquid crystal display device 300 shown in FIGS. 11 and 12 differs from the liquid crystal display device 100 according to Embodiment 1 in that when seen from a direction normal to the display surface, the center of the first contact hole CH1 and the center of the second contact hole CH2 substantially overlap each other. In the illustrated example, furthermore, when seen from a direction normal to the display surface, the respective centers of the first contact hole CH1 and the second contact hole CH2 and the respective centers of the first contact electrode ce1, the second contact electrode ce2, and the third contact electrode ce3 substantially overlap each other.

The substantial overlap between the center of the first contact hole CH1 and the center of the second contact hole CH2 as in the case of the present embodiment makes it possible to reduce the area of a light-blocking layer (third contact electrode ce3) that shields, from light, the regions in which the first contact hole CH1 and the second contact hole CH2 are formed, thus bringing about improvement in transmittance. As in the case of the description of the liquid crystal display device 200 according to Embodiment 2, the TFT substrate 10 may include a member (such as a gate wire or a source wire) that functions as a light-blocking layer other than the third contact electrode ce3.

In the liquid crystal display device 300 according to the present embodiment too, a yellow shift in reflection whiteness is reduced, as the length L1 of a portion of the inclined portion P3 included in the reflection region Rf and the length L2 of a portion of the lower step portion P2 included in the reflection region Rf satisfy the relationship L1+L2≤1.81·L1. In the illustrated example, the outer shape (i.e. the shape of a boundary with the reflection region Rf) of the transmission region Tr of the liquid crystal display device 300 is identical to the outer shape of the transmission region Tr of the liquid crystal display device 100 according to Embodiment 1. Therefore, the verification results based on the simulated calculations explained in Embodiment 1 are also applicable to the liquid crystal display device 300 according to the present embodiment.

Embodiment 4

Figure 13:
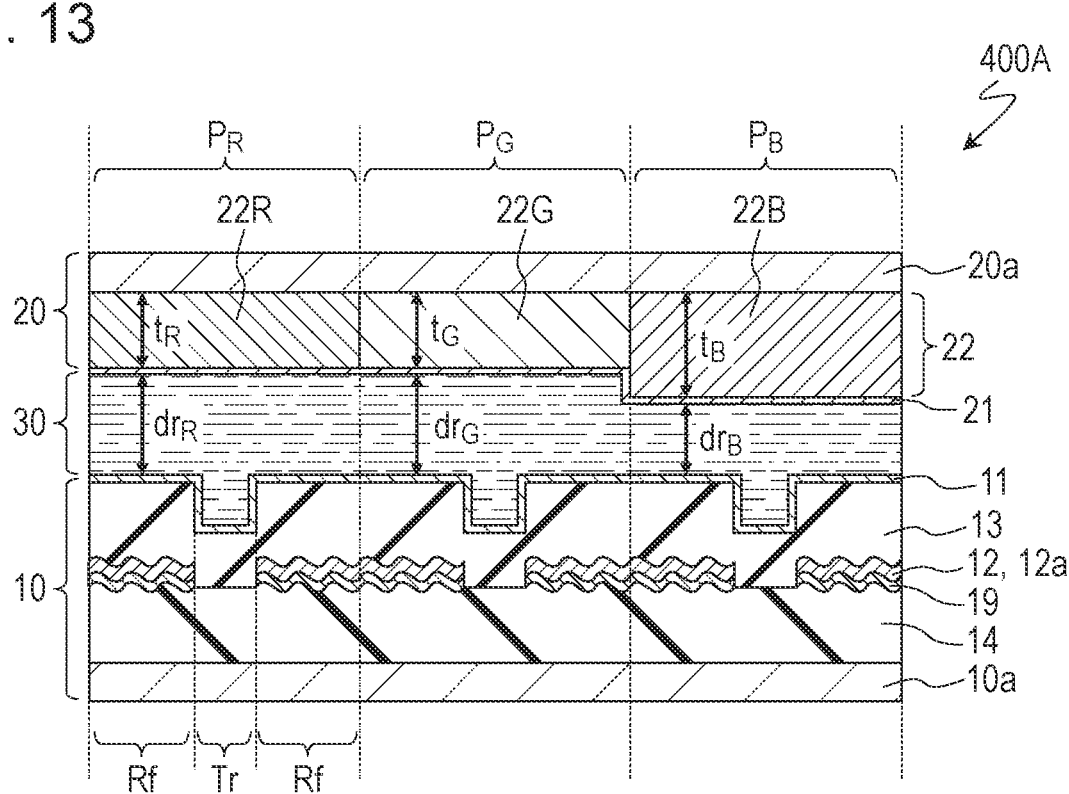
FIG. 13 is a cross-sectional view schematically showing still another liquid crystal display device according to an embodiment of the present disclosure, showing a region corresponding to a red pixel, a green pixel, and a blue pixel.
Figure 14:
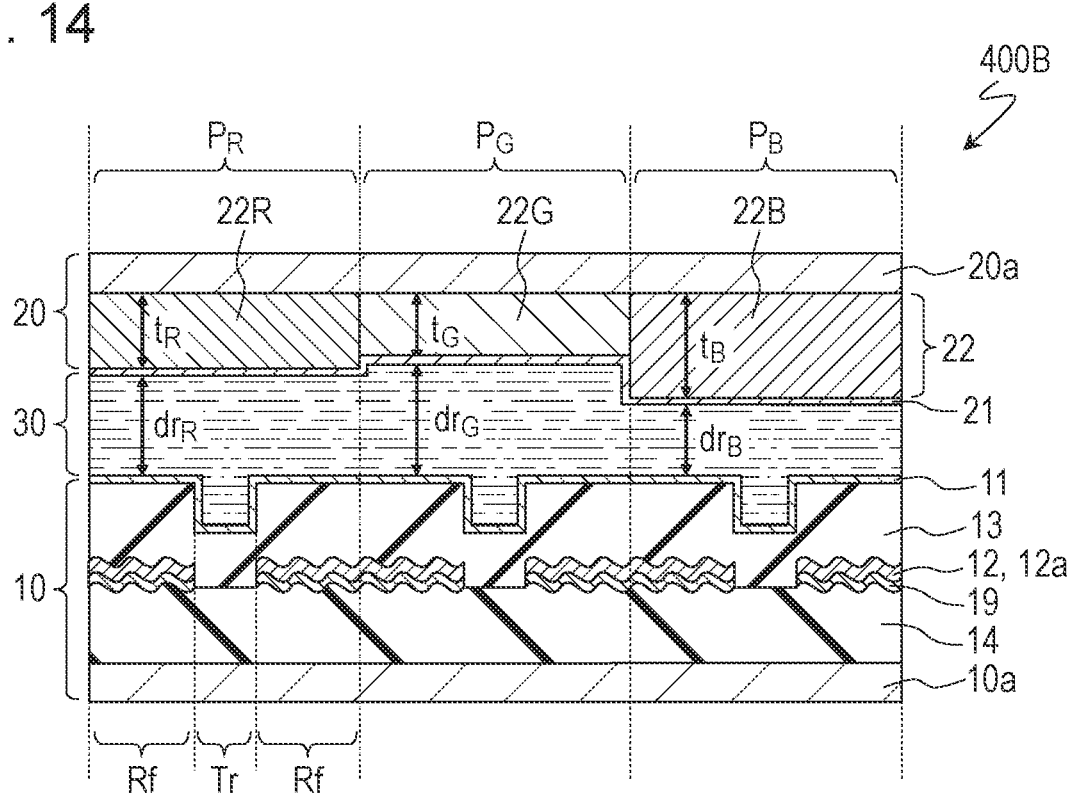
FIG. 14 is a cross-sectional view schematically showing still another liquid crystal display device according to the embodiment of the present disclosure, showing a region corresponding to a red pixel, a green pixel, and a blue pixel.
Figure 15:
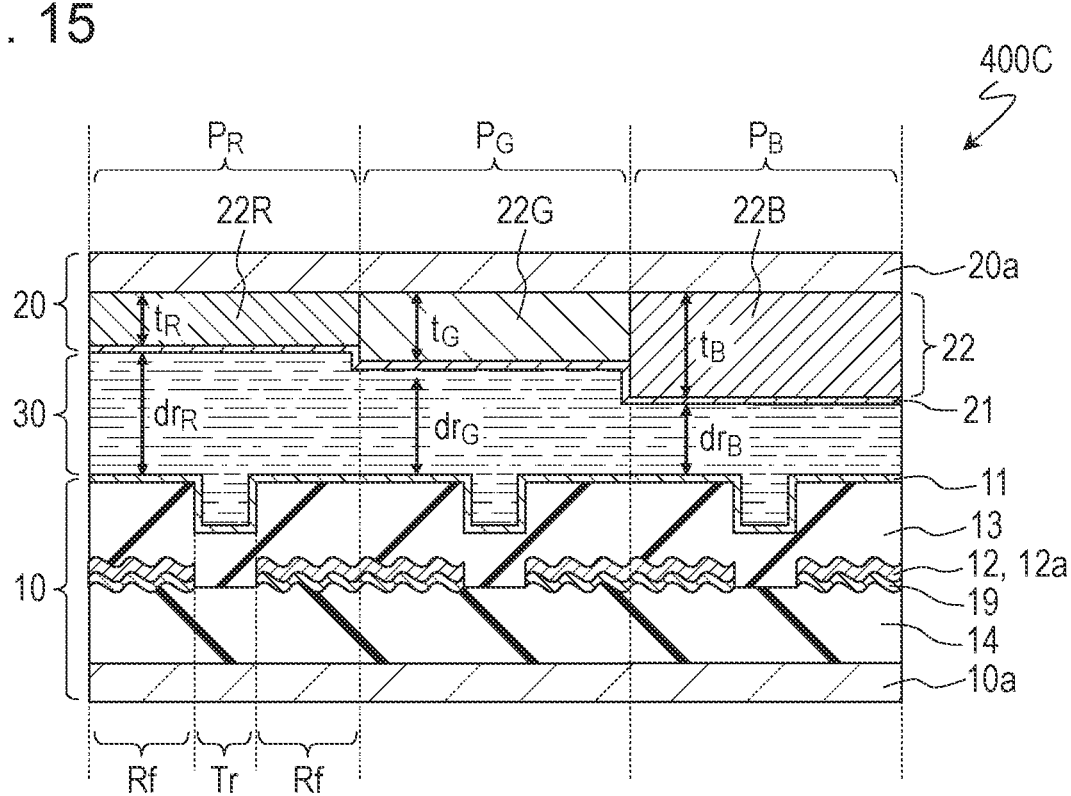
FIG. 15 is a cross-sectional view schematically showing still another liquid crystal display device according to the embodiment of the present disclosure, showing a region corresponding to a red pixel, a green pixel, and a blue pixel.

Liquid crystal display devices 400A, 400B, and 400C according to the present embodiment are described with reference to FIGS. 13, 14, and 15. FIGS. 13, 14, and 15 are cross-sectional views schematically showing the liquid crystal display devices 400A, 400B, and 400C, respectively, each showing a region corresponding to a red pixel $P_R$, a green pixel $P_G$, and a blue pixel $P_B$. It should be noted that FIGS. 13, 14, and 15 omit to illustrate some constituent elements, and do not illustrate the regions in which the first contact hole CH1 and the second contact hole CH2 are formed, either.

Further, in each of the liquid crystal display devices 400A, 400B, and 400C according to the present embodiment too, the length L1 of a portion of the inclined portion P3 included in the reflection region Rf and the length L2 of a portion of the lower step portion P2 included in the reflection region Rf satisfy the relationship L1+L2≤1.81·L1, whereby a yellow shift in reflection whiteness is reduced, although the inclined portion P3 is not illustrated, either.

As shown in FIGS. 13, 14, and 15, the color filter layer 22 of each of the liquid crystal display devices 400A, 400B, and 400C includes a red color filter 22R disposed in the red pixel $P_R$, a green color filter 22G disposed in the green pixel $P_G$, and a blue color filter 22B disposed in the blue pixel $P_B$. The thickness $t_B$ of the blue color filter 22B is greater than the thickness $t_R$ of the red color filter 22R and the thickness $t_G$ of the green color filter 22G. Therefore, the reflection cell gap $dr_B$ of the blue pixel $P_B$ is smaller than the reflection cell gap $dr_R$ of the red pixel $P_R$ and the reflection cell gap $dr_G$ of the green pixel $P_G$.

Specifically, in the liquid crystal display device 400A shown in FIG. 13, the reflection cell gap $dr_R$ of the red pixel $P_R$ and the reflection cell gap $dr_G$ of the green pixel $P_G$ are equal to each other, and the reflection cell gap $dr_B$ of the blue pixel $P_B$ is smaller than them (i.e. $dr_R=dr_G>dr_B$). Further, in the liquid crystal display device 400B shown in FIG. 14, the reflection cell gap $dr_R$ of the red pixel $P_R$ is smaller than the reflection cell gap $dr_G$ of the green pixel $P_G$, and the reflection cell gap $dr_B$ of the blue pixel $P_B$ is smaller than the reflection cell gap $dr_R$ of the red pixel $P_R$ (i.e. $dr_G>dr_R>dr_B$) In the liquid crystal display device 400C shown in FIG. 15, the reflection cell gap $dr_G$ of the green pixel $P_G$ is smaller than the reflection cell gap $dr_R$ of the red pixel $P_R$, the reflection cell gap $dr_B$ of the blue pixel $P_B$ is smaller than the reflection cell gap $dr_G$ of the green pixel $P_G$ (i.e. $dr_R>dr_G>dr_B$).

As mentioned above, in each of the liquid crystal display devices 400A, 400B, and 400C according to the present embodiment, the reflection cell gap $dr_B$ of the blue pixel $P_B$ is smaller than the reflection cell gap $dr_R$ of the red pixel $P_R$ and the reflection cell gap $dr_G$ of the green pixel $P_G$, whereby changes in reflection chromaticity entailed by variations in cell gap can be reduced. In the following, this point is explained in comparison with a liquid crystal display device 400D shown in FIG. 16 and a liquid crystal display device 400E shown in FIG. 17.

Figure 16:
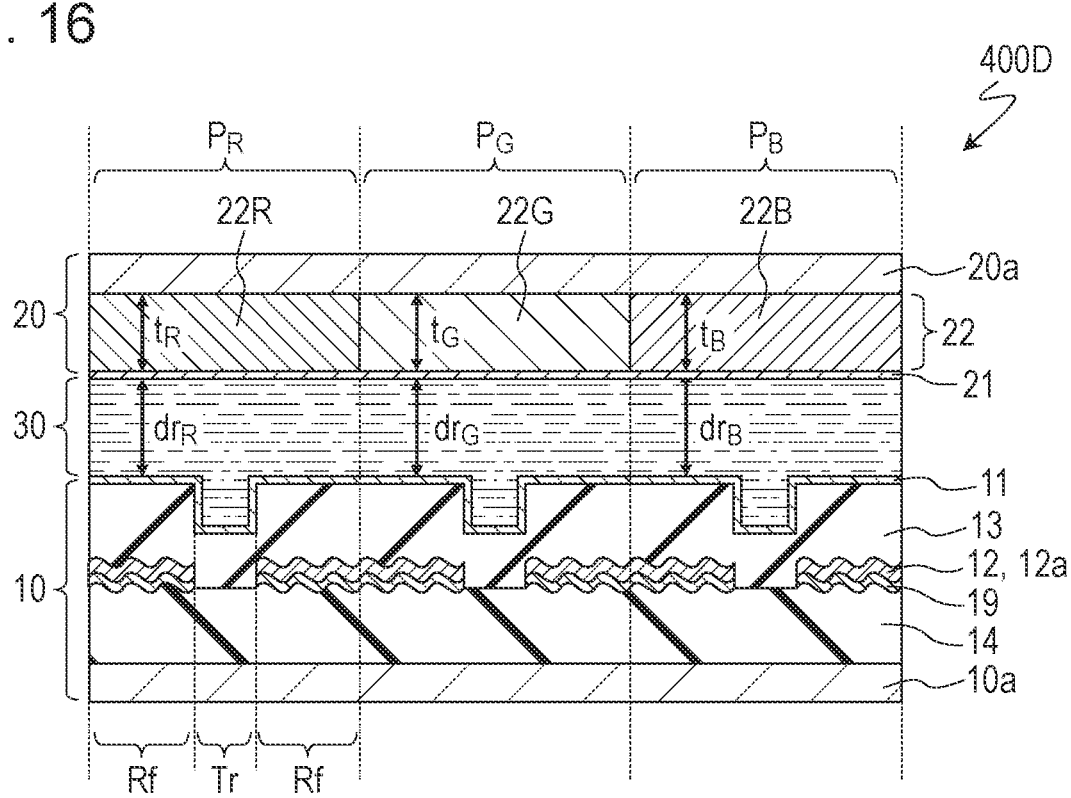
FIG. 16 is a cross-sectional view schematically showing still another liquid crystal display device according to the embodiment of the present disclosure, showing a region corresponding to a red pixel, a green pixel, and a blue pixel.
Figure 17:
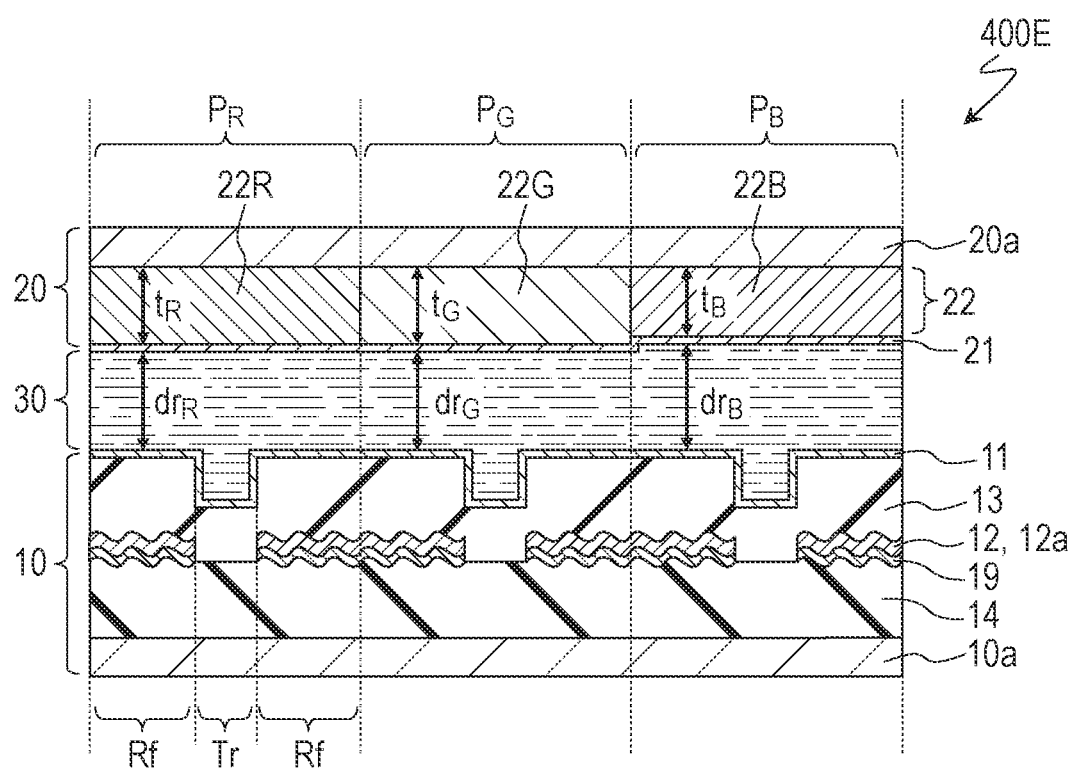
FIG. 17 is a cross-sectional view schematically showing still another liquid crystal display device according to the embodiment of the present disclosure, showing a region corresponding to a red pixel, a green pixel, and a blue pixel.

In the liquid crystal display device 400D shown in FIG. 16, the reflection cell gap $dr_R$ of the red pixel $P_R$, the reflection cell gap $dr_G$ of the green pixel $P_G$, and the reflection cell gap $dr_B$ of the blue pixel $P_B$ are equal to one another (i.e. $dr_R=dr_G=dr_B$). Further, in the liquid crystal display device 400E shown in FIG. 17, the reflection cell gap $dr_R$ of the red pixel $P_R$ and the reflection cell gap $dr_G$ of the green pixel $P_G$ are equal to each other, and the reflection cell gap $dr_B$ of the blue pixel $P_B$ is greater than them (i.e. $dr_R=dr_G<dr_B$).

Figure 18:
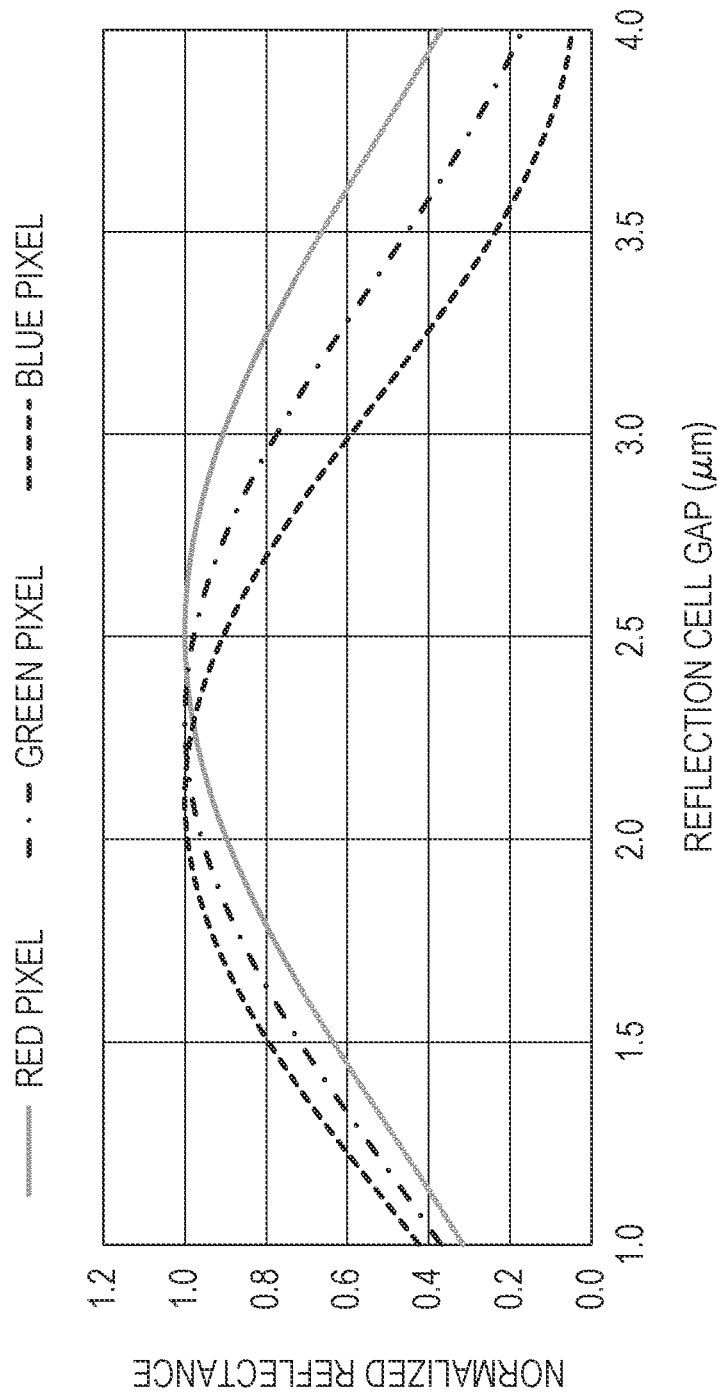
FIG. 18 is a graph showing results of simulated calculations of changes in reflectance of a red pixel, a green pixel, and a blue pixel with respect to variations in cell gap for the liquid crystal display device ($dr_R=dr_G=dr_B$) of Example 9.

FIG. 18 shows results of simulated calculations of changes in reflectance of a red pixel $P_R$, a green pixel $P_G$, and a blue pixel $P_B$ with respect to variations in cell gap for the liquid crystal display device 400D ($dr_R=dr_G=dr_B$), which carries out a display in the VA-ECB mode. FIG. 18 shows, as reflectances, normalized reflectances that are normalized by the respective maximum reflectances of the red pixel $P_R$, the green pixel $P_G$, and the blue pixel $P_B$.

FIG. 18 shows that the red pixel $P_R$, the green pixel $P_G$, and the blue pixel $P_B$ reach their respective maximum reflectances at different reflection cell gaps dr. This is attributed to high wavelength dependency (wavelength dispersibility), as the VA-ECB mode is a display mode with a twist angle of 0 degree. Therefore, variations in the finished value of the reflection cell gaps dr may lead to great variations in reflection chromaticity.

Figure 19:
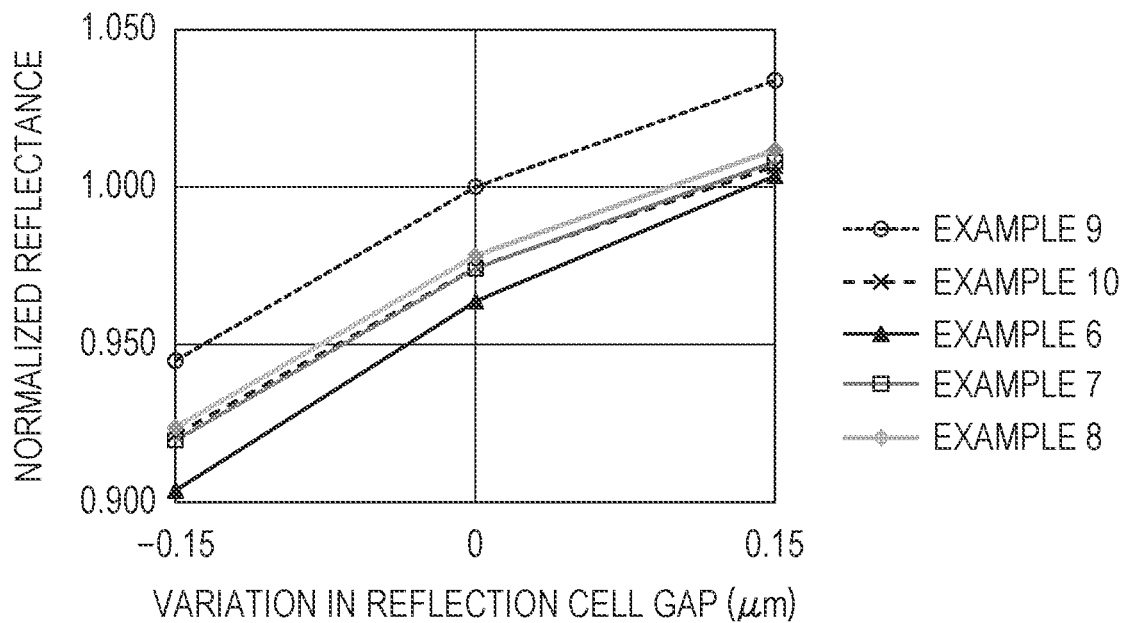
FIG. 19 is a graph showing results of simulated calculations of changes in reflectance in a case where the respective cell gaps of a red pixel, a green pixel, and a blue pixel are at an average and in the presence of variations of ±0.15 μm in cell gap with respect to the average for the liquid crystal display devices of Examples 6 to 10.

FIG. 19 and Table 3 show results of simulated calculations of changes in reflectance in a case where the respective cell gaps of a red pixel $P_R$, a green pixel $P_G$, and a blue pixel $P_B$ are at an average and in the presence of variations of ±0.15 µm in cell gap with respect to the average for each the liquid crystal display devices 400A, 400B, 400C, 400D, and 400E (hereinafter referred to as "Examples 6, 7, 8, 9, and 10, respectively). It should be noted that FIG. 19 and Table 3 show, as reflectances, normalized reflectances that are normalized by reflectances when the reflection cell gaps dr are at an average in Example 9. Further, FIG. 20 and Table 4 show results of simulated calculations of changes in reflection whiteness in a case where the respective cell gaps of a red pixel $P_R$, a green pixel $P_G$, and a blue pixel $P_B$ are at an average and in the presence of variations of ±0.15 µm in cell gap with respect to the average for the liquid crystal display devices of Examples 6 to 10.

The reflection cell gaps $dr_R$, $dr_G$, and $dr_B$ of the red pixel $P_R$, the green pixel $P_G$, and the blue pixel $P_B$ can be adjusted by changing the thicknesses $t_R$, $t_G$, and $t_B$ of the red color filter 22R, the green color filter 22G, and the blue color filter 22B, respectively. In changing the thickness of each color filter, a pigment concentration or other properties may be adjusted so that spectral characteristics do not change.

An embodiment of the present disclosure makes it possible to reduce a yellow shift in reflection whiteness and/or changes in reflection chromaticity entailed by variations in cell gap in a semi-transmissive liquid crystal display device that has a double-electrode structure and a multiple-gap structure and whose liquid crystal layer has a twist angle of

TABLE 3

|  | Average reflection cell gap [µm] | | | Normalized reflectance | | |
|---|---|---|---|---|---|---|
|  | | | | Average reflection cell gap −0.15 µm | Average reflection cell gap | Average reflection cell gap +0.15 µm |
|  | R | G | B | | | |
| Example 9 | 2.00 | 2.00 | 2.00 | 0.94 | 1.00 | 1.03 |
| Example 10 | 2.00 | 2.00 | 2.05 | 0.92 | 0.97 | 1.01 |
| Example 6 | 2.00 | 2.00 | 1.70 | 0.90 | 0.96 | 1.00 |
| Example 7 | 2.00 | 2.06 | 1.70 | 0.92 | 0.97 | 1.01 |
| Example 8 | 2.09 | 2.04 | 1.70 | 0.92 | 0.98 | 1.01 |

TABLE 4

|  | Average reflection cell gap [µm] | | | Reflection whiteness | | | | | |
|---|---|---|---|---|---|---|---|---|---|
|  | | | | Average reflection cell gap −0.15 µm | | Average reflection cell gap | | Average reflection cell gap +0.15 µm | |
|  | R | G | B | x | y | x | y | x | y |
| Example 9 | 2.00 | 2.00 | 2.00 | 0.296 | 0.327 | 0.304 | 0.334 | 0.313 | 0.344 |
| Example 10 | 2.00 | 2.00 | 2.05 | 0.299 | 10.326 | 0.308 | 0.335 | 0.318 | 0.344 |
| Example 6 | 2.00 | 2.00 | 1.70 | 0.304 | 0.328 | 0.309 | 0.332 | 0.315 | 0.337 |
| Example 7 | 2.00 | 2.06 | 1.70 | 0.305 | 0.331 | 0.310 | 0.334 | 0.316 | 0.339 |
| Example 8 | 2.09 | 2.04 | 1.70 | 0.308 | 0.330 | 0.312 | 0.334 | 0.318 | 0.339 |

Figure 20:
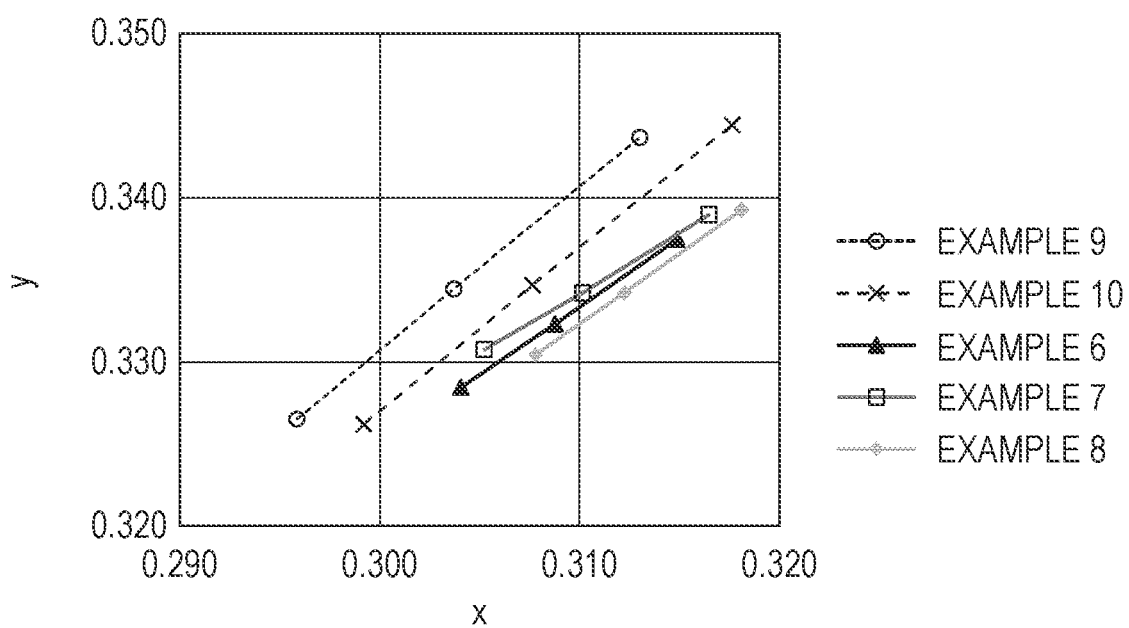
FIG. 20 is a graph showing results of simulated calculations of changes in reflection whiteness in a case where the respective cell gaps of a red pixel, a green pixel, and a blue pixel are at an average and in the presence of variations of ±0.15 μm in cell gap with respect to the average for the liquid crystal display devices of Examples 6 to 10.

A comparison between Example 9 ($dr_R=dr_G=dr_B$) and Example 10 ($dr_R=dr_G<dr_B$) shows that while Example 10 can maintain a reflectance high than or equal to 90% of the reflectance of Example 9 as shown in FIG. 19 and Table 3 but is about equal in variation of reflection whiteness to Example 9 as shown in FIG. 20 and Table 4. On the other hand, Examples 6, 7, and 8 exhibit great improvement in variation of reflection whiteness while maintaining reflectances higher than or equal to 90% of the reflectance of Example 9. This shows that changes in reflection chromaticity entailed by variations in cell gap can be reduced by making the reflection cell gap $dr_B$ of the blue pixel $P_B$ smaller than the reflection cell gap $dr_R$ of the red pixel $P_R$ and the reflection cell gap $dr_G$ of the green pixel $P_G$.

Further, Examples 7 and 8 give higher reflectances than Example 6. This shows that both reduction of changes in reflection chromaticity and improvement in reflectance can be achieved by not only reducing the reflection cell gap $dr_B$ of the blue pixel $P_B$ but also adjusting the reflection cell gap $dr_R$ of the red pixel $P_R$ and the reflection cell gap $dr_G$ of the green pixel $P_G$ as in the case of Examples 7 and 8.

0 degree. A semi-transmissive liquid crystal display device according to an embodiment of the present disclosure is suitably used as a display device for use in a smartwatch or out-of-home advertising digital signage.

The present disclosure contains subject matter related to that disclosed in Japanese Priority Patent Application JP 2022-074479 filed in the Japan Patent Office on Apr. 28, 2022, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display device comprising:
   a first substrate;
   a second substrate facing the first substrate;
   a liquid crystal layer provided between the first substrate and the second substrate; and
   a plurality of pixels arrayed in a matrix,
   wherein each of the plurality of pixels includes a reflection region in which a display is carried out in a reflection mode and a transmission region in which a display is carried out in a transmission mode, the first substrate includes a reflecting layer including a portion located in the reflection region of each pixel, a first insulating layer provided so as to cover the reflecting layer, and a pixel electrode provided on top of the first insulating layer and disposed in each pixel, a thickness of the liquid crystal layer in the transmission region is greater than a thickness of the liquid crystal layer in the reflection region, the liquid crystal layer has a twist angle of substantially 0 degree, a surface of the first substrate that faces the liquid crystal layer has a step including an upper step portion located in at least the reflection region, a lower step portion located in at least the transmission region, and an inclined portion connecting the upper step portion with the lower step portion, and when viewed from a direction normal to a display surface, a length (L1) of a portion of the inclined portion included in the reflection region and a length (L2) of a portion of the lower step portion included in the reflection region satisfy a relationship $L1+L2 \leq 1.81 \cdot L1$.

2. The liquid crystal display device according to claim 1, wherein the inclined portion and the lower step portion are not included in the reflection region.

3. The liquid crystal display device according to claim 1, wherein the inclined portion is at least partially included in the reflection region, and the lower step portion is not included in the reflection region.

4. The liquid crystal display device according to claim 1, wherein an entirety of the inclined portion and a part of the lower step portion are included in the reflection region.

5. The liquid crystal display device according to claim 1, wherein the plurality of pixels include a red pixel that displays red, a green pixel that displays green, and a blue pixel that displays blue, and a thickness of the liquid crystal layer in the reflection region of the blue pixel is smaller than both a thickness of the liquid crystal layer in the reflection region of the red pixel and a thickness of the liquid crystal layer in the reflection region of the green pixel.

6. The liquid crystal display device according to claim 5, wherein the second substrate includes a color filter layer, the color filter layer includes a red color filter disposed in the red pixel, a green color filter disposed in the green pixel, and a blue color filter disposed in the blue pixel, and a thickness of the blue color filter is greater than both a thickness of the red color filter and a thickness of the green color filter.

7. The liquid crystal display device according to claim 1, wherein the first substrate includes a backplane circuit electrically connected to the pixel electrode and a second insulating layer provided so as to cover the backplane circuit, the reflecting layer is provided over the second insulating layer, and the first substrate further includes a contact portion that electrically connects the pixel electrode to the backplane circuit through a first contact hole formed in the first insulating layer and a second contact hole formed in the second insulating layer.

8. The liquid crystal display device according to claim 7, wherein the contact portion includes a transparent contact electrode, formed from a transparent conductive material, that includes a portion located in the second contact hole, and a reflecting contact electrode, formed at an identical layer to the reflecting layer so as to make contact with the transparent contact electrode, that includes a portion overlapping the first contact hole.

9. The liquid crystal display device according to claim 7, wherein the contact portion includes a transparent contact electrode, formed from a transparent conductive material, that includes a portion located in the second contact hole and a portion overlapping the first contact hole, and does not include an electrode formed at an identical layer to the reflecting layer.

10. The liquid crystal display device according to claim 7, wherein when viewed from a direction normal to the display surface, a center of the first contact hole and a center of the second contact hole substantially overlap each other.

* * * * *